United States Patent [19]
Meschter et al.

[11] Patent Number: 5,974,263
[45] Date of Patent: Oct. 26, 1999

[54] SINGLE USE CAMERA EMPLOYING SELF-DEVELOPING FILM AND METHOD THEREOF

[75] Inventors: John E. Meschter, Stow; Philip R. Norris, North Reading; Kenneth C. Waterman, Concord, all of Mass.

[73] Assignee: Polaroid Corporation, Cambridge, Mass.

[21] Appl. No.: 08/623,018

[22] Filed: Mar. 28, 1996

Related U.S. Application Data

[63] Continuation-in-part of application No. 08/549,654, Oct. 27, 1995, abandoned.

[51] Int. Cl.[6] .............................. G03B 17/02; G03B 17/50
[52] U.S. Cl. .................................. 396/6; 396/30; 396/35
[58] Field of Search ................................ 354/83, 85, 86, 354/88; 396/30, 31, 32, 33, 34, 35, 36, 38, 39, 42, 6

[56] References Cited

U.S. PATENT DOCUMENTS

| | | | |
|---|---|---|---|
| 3,314,792 | 4/1967 | Land | 96/76 |
| 3,455,692 | 7/1969 | Bacheldor | 96/78 |
| 4,291,966 | 9/1981 | Bendoni et al. | 354/304 |
| 4,569,578 | 2/1986 | Stella et al. | 354/76 |
| 4,605,608 | 8/1986 | Bullitt | 430/206 |
| 4,660,951 | 4/1987 | Reed et al. | 354/187 |
| 4,779,110 | 10/1988 | Stella | 354/88 |
| 4,884,088 | 11/1989 | Mauchan | 354/86 |
| 4,893,144 | 1/1990 | Sorli | 354/304 |
| 4,962,398 | 10/1990 | Sorg et al. | 354/86 |
| 5,001,502 | 3/1991 | Douglas | 354/86 |
| 5,023,636 | 6/1991 | Douglas | 354/86 |
| 5,040,009 | 8/1991 | Mizuno | 354/275 |
| 5,073,464 | 12/1991 | Osawa et al. | 430/30 |
| 5,103,249 | 4/1992 | Keene | 354/85 |
| 5,134,429 | 7/1992 | Ishikawa et al. | 354/304 |
| 5,285,894 | 2/1994 | Kamata et al. | 206/316.1 |
| 5,453,804 | 9/1995 | Norris et al. | 354/83 |

OTHER PUBLICATIONS

PCT International Search Report, dated Feb. 26, 1997.

*Primary Examiner*—Safet Metjahic
*Assistant Examiner*—Christopher E. Mahoney
*Attorney, Agent, or Firm*—Leslie Payne

[57] ABSTRACT

There is disclosed an improved photographic apparatus of the self-developing type and method of operation which includes a film assemblage. The camera includes a housing assembly; strip of photographic film; a strip of self-developing photosensitive film; a foldable strip of carrier sheet material; a mechanism for taking up the photosensitive film strip past an exposure station for exposure thereof and for storage of the exposed photosensitive film strip. An advancing mechanism is provided for advancing the exposed photosensitive film strip from the taking up mechanism and the carrier strip through an exit. Provision is made for a mechanism which is operable for dispensing processing fluid between the exposed film strip and the sheet; and, a pressure applying mechanism is operable for superimposing the photosensitive film relative to the carrier sheet following dispensing of the fluid between the film and sheet for distributing the fluid over preselected portions of the exposed photosensitive film to form an integral photographic film strip in response to the advancing mechanism withdrawing the strip and the sheet through the pressure applying mechanism and the exit.

42 Claims, 23 Drawing Sheets

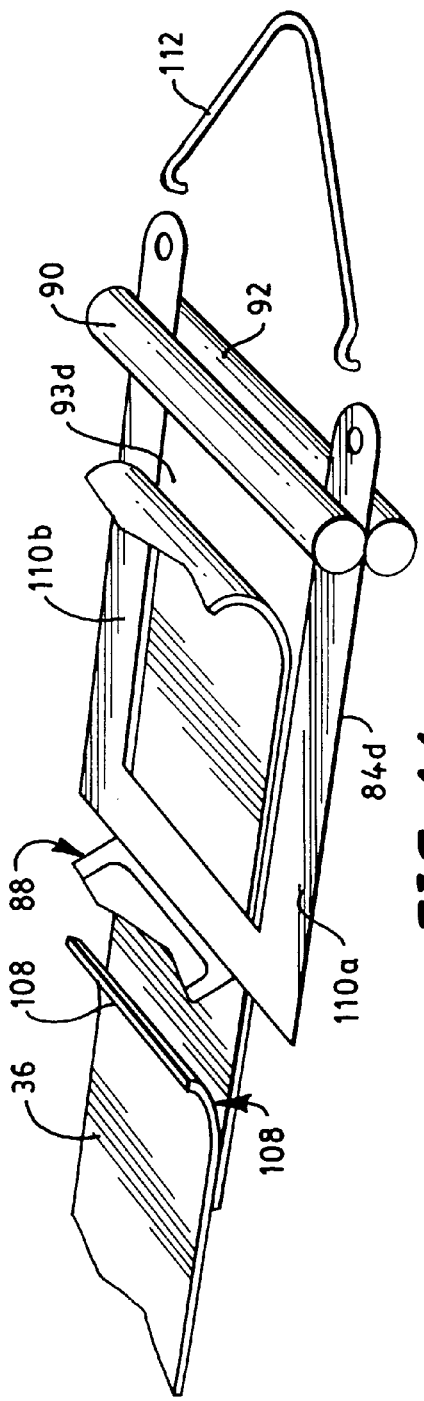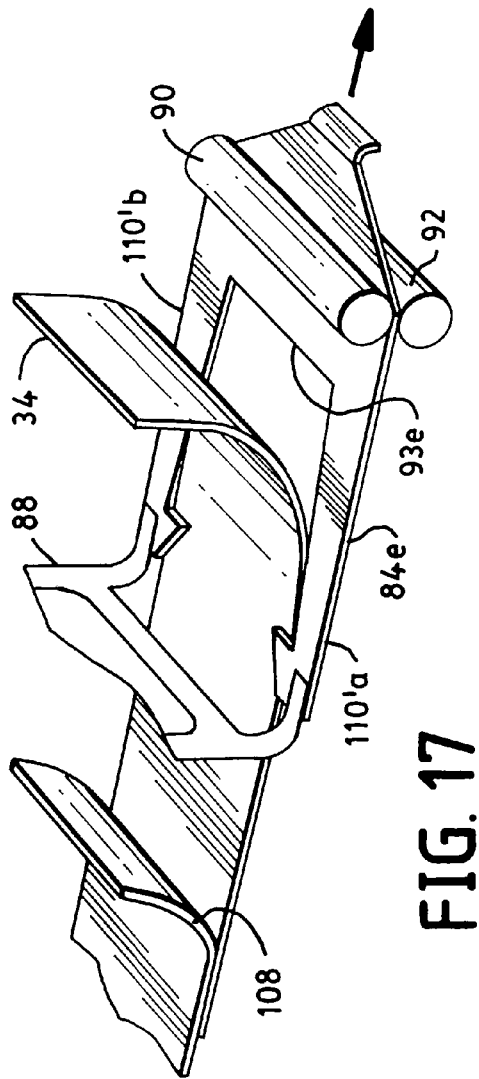

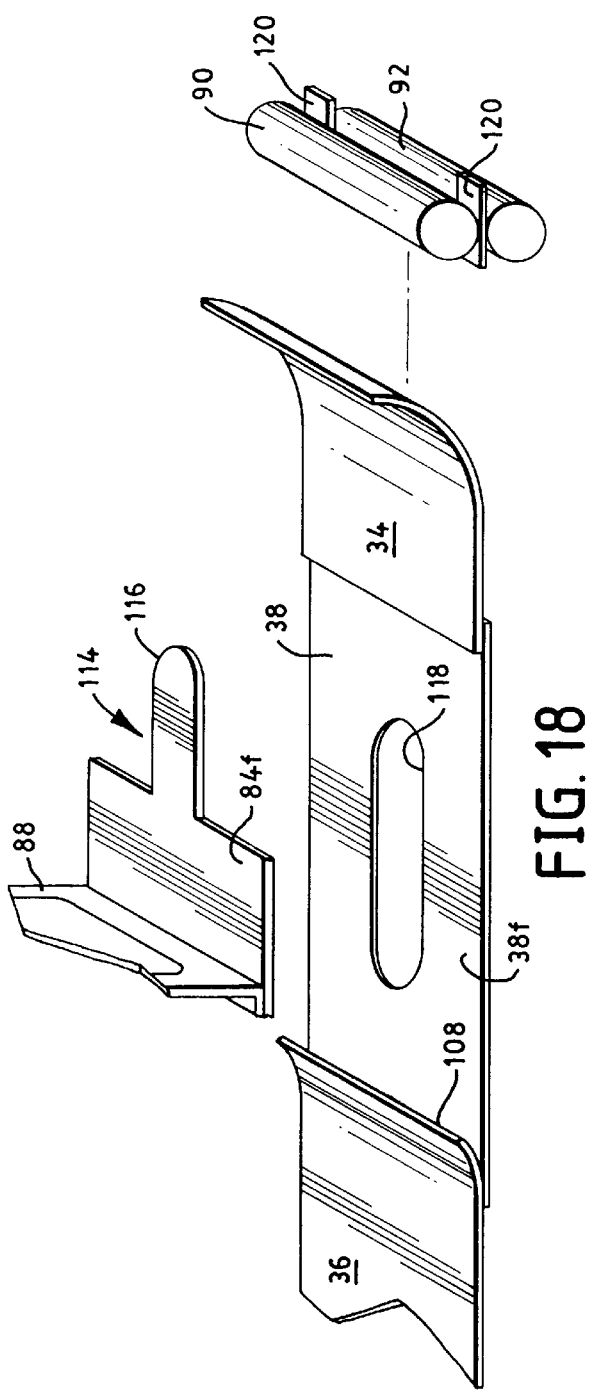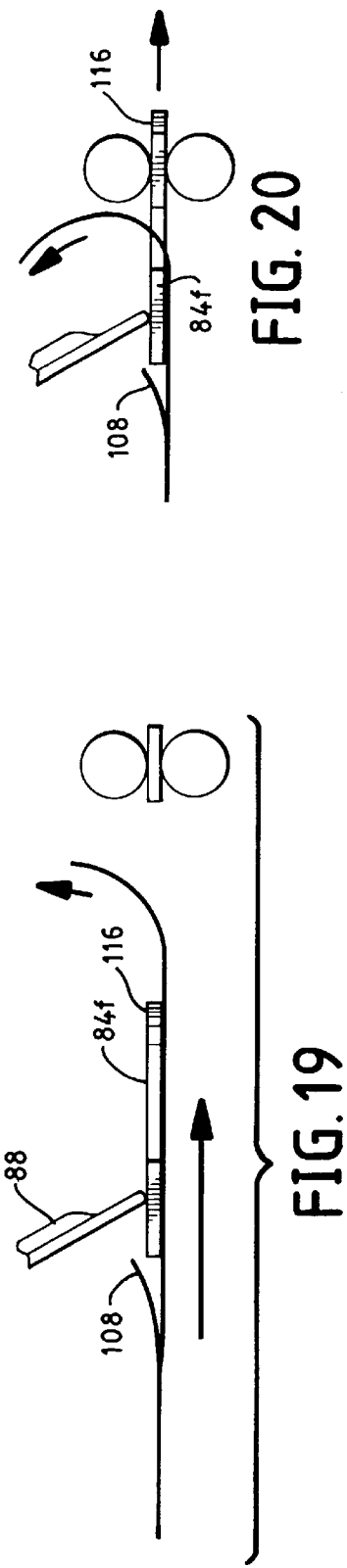

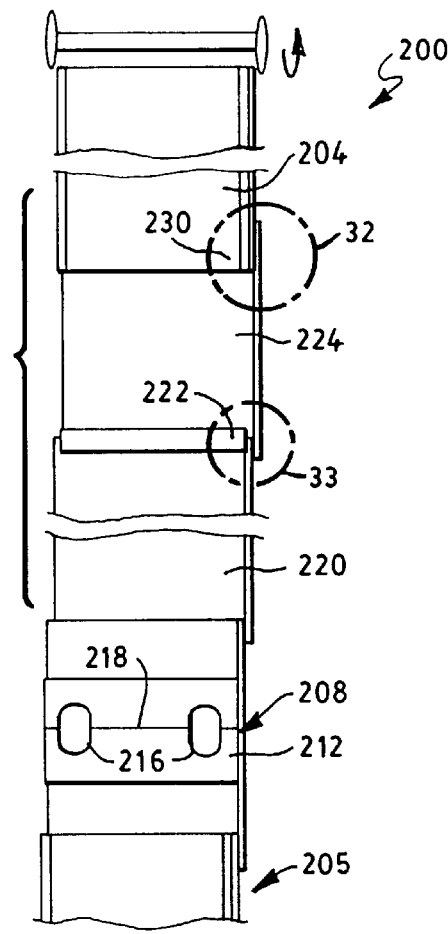
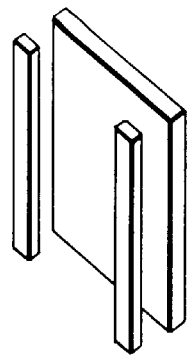
FIG. 31
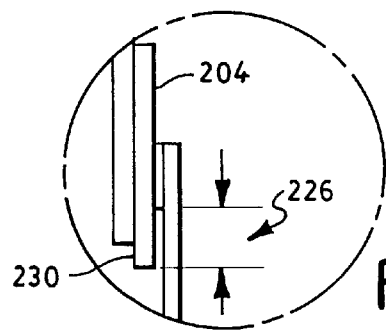
FIG. 32
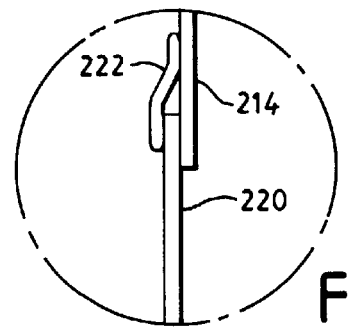
FIG. 33
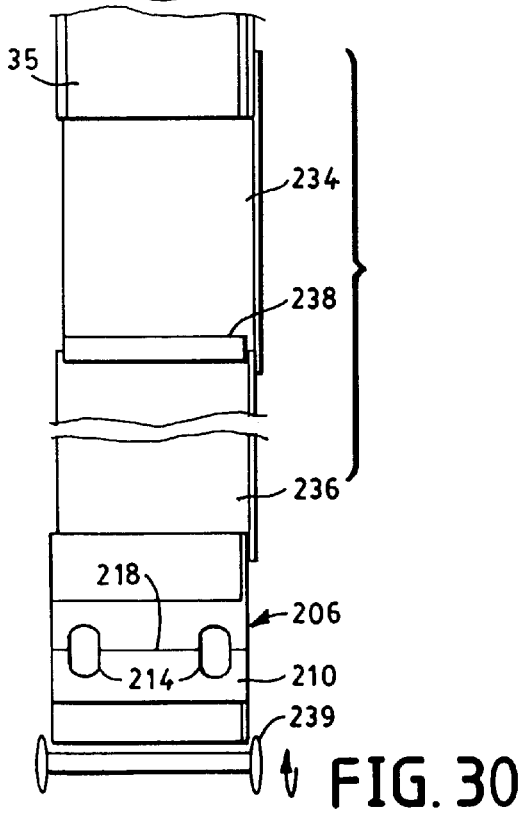
FIG. 30
FIG. 34

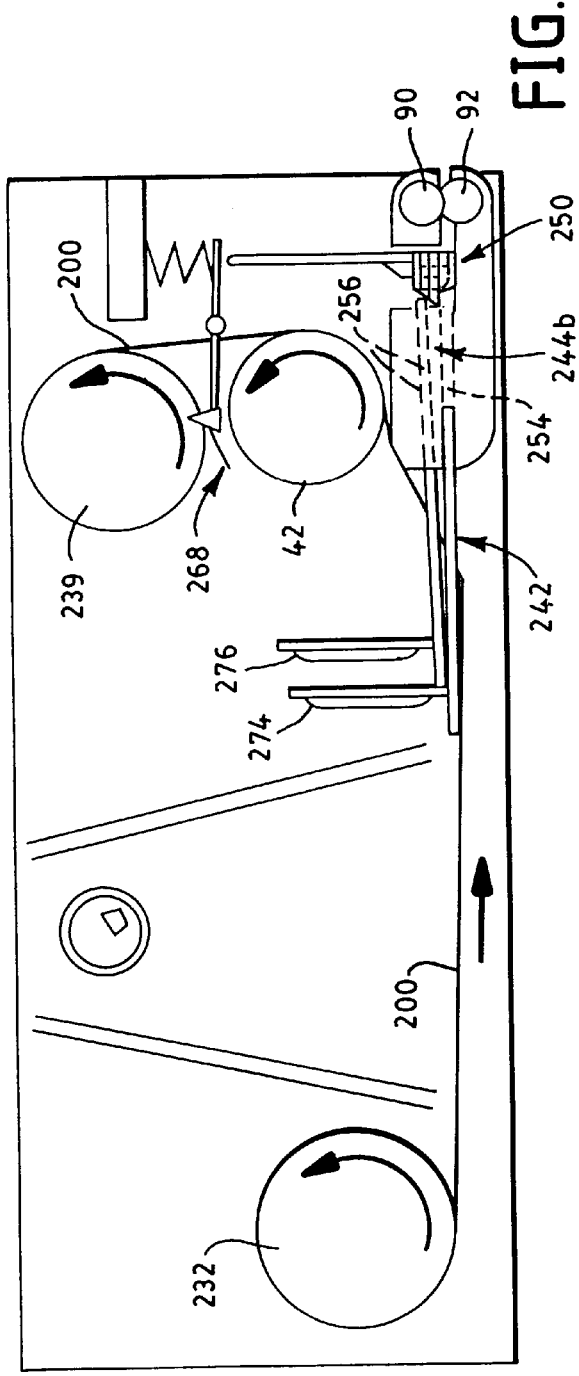
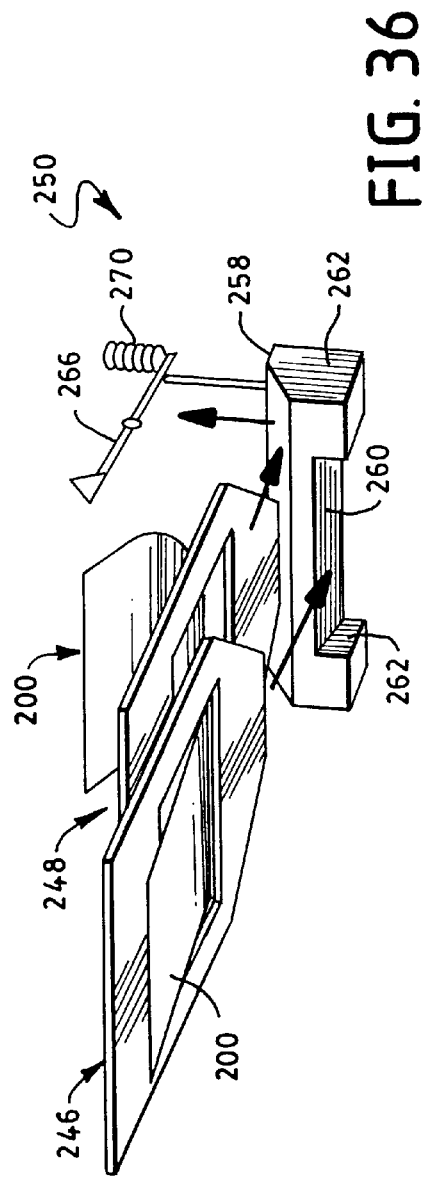

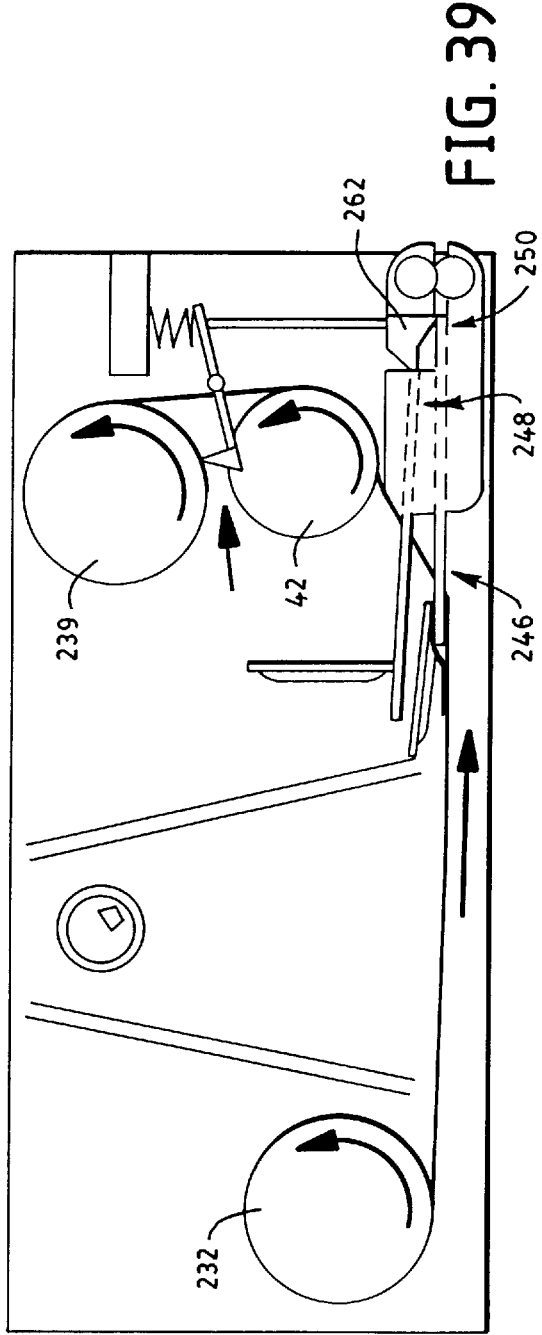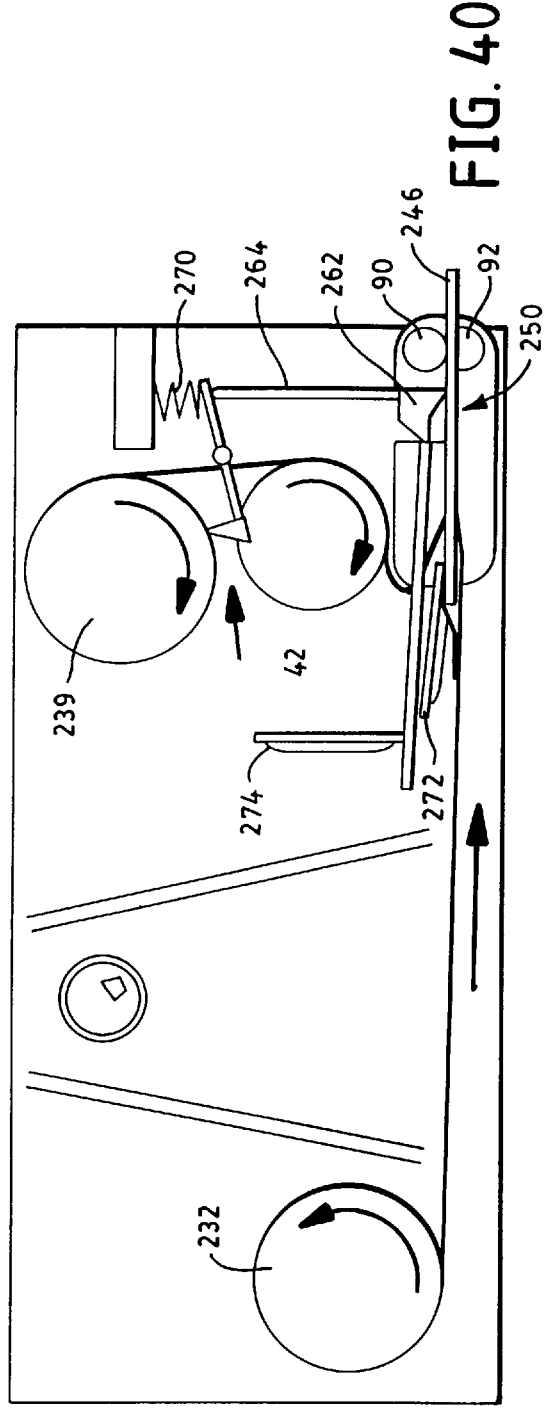

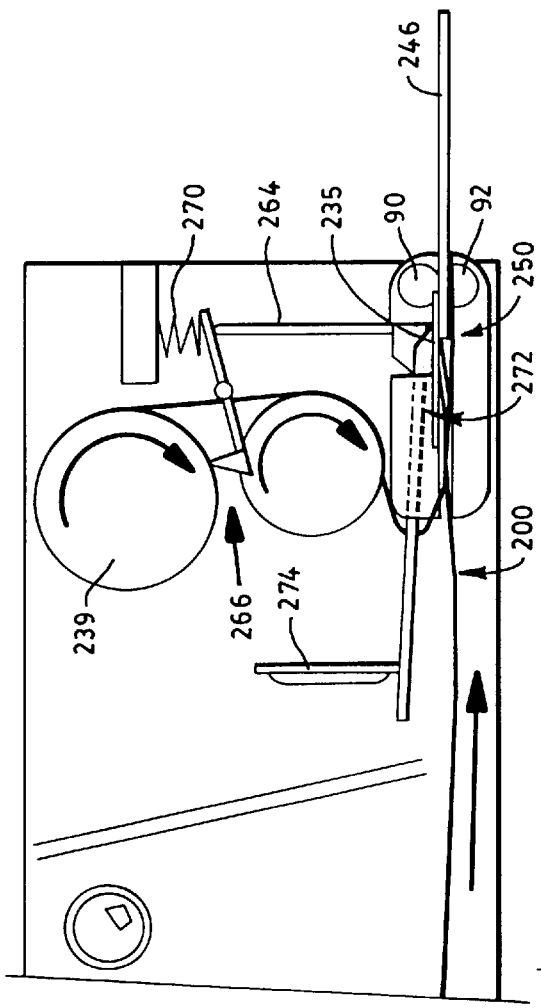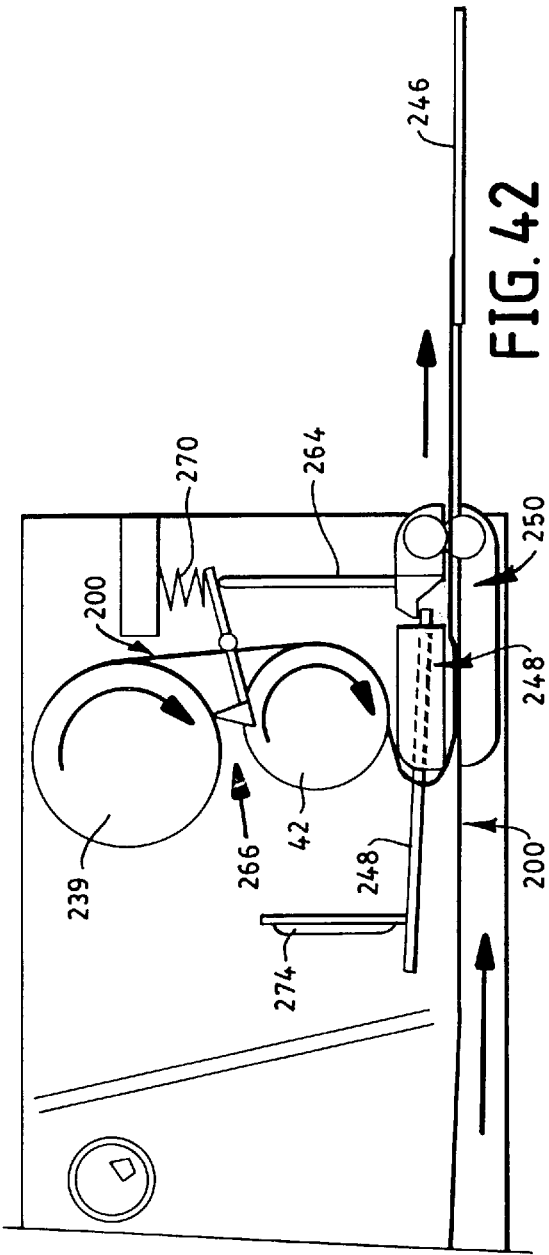

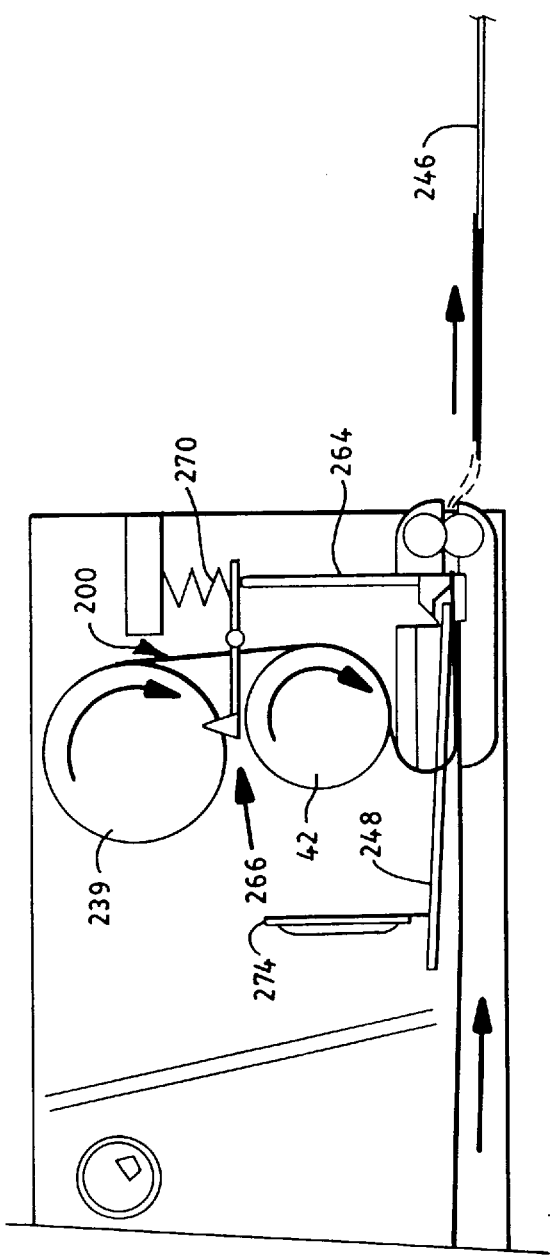
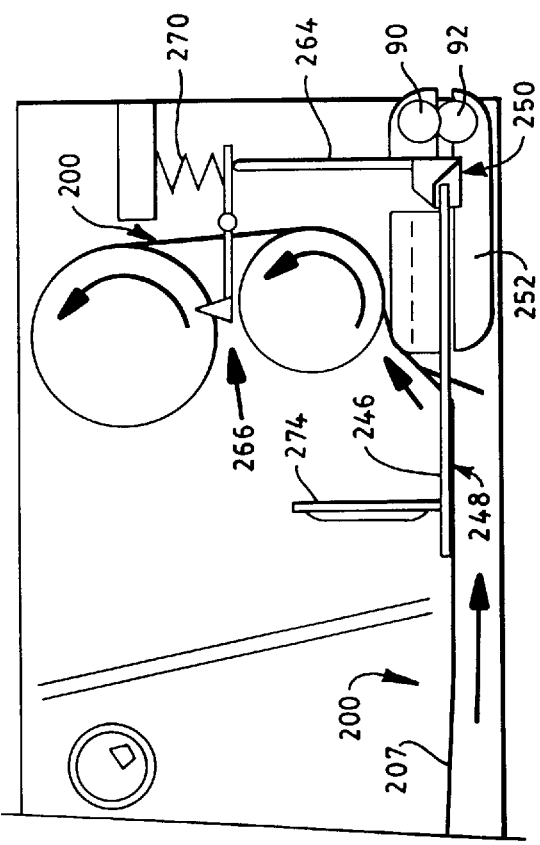
FIG. 43
FIG. 46

SINGLE USE CAMERA EMPLOYING SELF-DEVELOPING FILM AND METHOD THEREOF

CROSS-REFERENCE TO RELATED APPLICATIONS

The present application is a continuation-in-part application related to U.S. patent application Ser. No. 08/549,654, filed in the U.S. Patent and Trademark Office on Oct. 27, 1995 now ABN, entitled "SINGLE USE CAMERA EMPLOYING SELF-DEVELOPING FILM AND METHOD THEREOF;" as well as copending U.S. patent application Ser. No. 08/829,435 and entitled "SINGLE USE CAMERA FOR EMPLOYING SINGLE FILM FRAME ASSEMBLAGES AND METHOD THEREOF."

BACKGROUND OF THE INVENTION

The present invention relates generally to photographic apparatus and methods and, in particular, to single use photographic apparatus and methods employing self-developing film.

For reasons of economy and convenience, so-called single use or disposable photographic cameras have gained widespread popularity in recent years. Typically, such cameras when sold contain conventional photographic film ready for exposure.

Following film exposure, the camera and film are forwarded to a developer for processing instead of merely the film; as is customarily the case. At the processor, the exposed film is removed from the cameras for processing; while the cameras are not returned to the user but can be discarded. In any event, the photographer must wait until the film is returned from the processor.

Self-developing type cameras employing self-developing film have enjoyed wide spread commercial success because they allow the user to obtain the instant results of their photographic efforts. In general, however, self-developing cameras are dedicated for repeated use. However, because of the appeal of disposable single use cameras, there are continuing efforts to provide the numerous benefits of self-developing film in a single use camera. In this regard, reference is made to commonly assigned U.S. Pat. No. 5,453,804 issued Sep. 26, 1995 that discloses a single use camera for processing self-developing film. While the approach described in this patent is successful, there is nevertheless a continuing desire to devise other approaches for processing self-developing film in the context of single use cameras.

SUMMARY OF THE INVENTION

According to the present invention, provision is made for apparatus and cameras for improving processing of self-developing film in the context of a single use or disposable camera.

Provision is made for a method of processing exposed photosensitive self-developing film in, preferably, a single use camera. Essentially, the steps comprise: providing a strip of exposed photosensitive self-developing film in a single use camera; providing a carrier sheet strip; advancing the photosensitive film and carrier sheet through a pressure-applying assembly and causing processing fluid to be dispensed between the film and carrier sheet before passing through the pressure applying assembly, whereby the processing fluid is spread between the film and the sheet as the latter are brought into a superimposed relationship to initiate development of the latent images as the film and the sheet emerge from the pressure applying assembly and exit the camera as an integral photographic film strip containing a series of processed images.

In an illustrated embodiment, the method further comprises the step of establishing a fluid seal along the longitudinal edges of the film and the sheet when the latter are brought into superimposed relationship with one another so as to form the integral film strip.

In another illustrated embodiment, the step of establishing the seal is achieved by reaction of the processing fluid with a self-sealing adhesive material formed at least along the marginal longitudinal edges of one of the film and the sheet. In this illustrated embodiment the covering sheet is a transparent sheet of material and has longitudinal rails thereon.

In another illustrated embodiment the step of dispensing the processing fluid is achieved by rupturing a reservoir of the fluid and dispensing its contact between the film and the carrier sheet before the latter are brought together into face-to-face contact by the pressure applying assembly.

In another embodiment, the advancing step includes employing a pull tab member coupled intermediate the film sheet and the carrier sheet which are connected in end-to-end relationship; whereby the pull tab member has an opening for allowing the photosensitive film to pass through the pull tab as the photosensitive film passes from the supply spool assembly to the take-up assembly during the exposure mode. For initiating processing, the pull tab is pulled from outside the camera by an operator for pulling the film and the carrier sheet through a pressure applying mechanism and effecting processing of the latent images.

In another illustrated embodiment, there is provided a step of advancing the photosensitive film to the take-up assembly by an amount which does not appreciably advance the carrier sheet from the supply means, whereby pulling of the pull tab will pull both the exposed photosensitive film and the carrier sheet so that the carrier sheet will be in face-to-face relationship with the photosensitive film as the two sheets pass through the spread assembly.

There is illustrated a method of sequentially processing individual exposable segments of photosensitive self-developing film in, preferably, a single use camera. One embodiment includes the steps of: providing a plurality of segments of exposable photosensitive self-developing film in a single use camera; providing a plurality of segments of carrier sheet in the camera; sequentially advancing corresponding and superimposable pairs of segments of film and carrier sheet through a pressure-applying assembly; selectively dispensing processing fluid between each corresponding pair of film and carrier sheet prior to passing through the pressure applying assembly, whereby the pressure-applying assembly spreads the processing fluid between corresponding pairs of film and carrier sheets as the latter are sequentially brought into a superimposed relationship for initiating development of the latent images as the respective pairs of film and the carrier sheet emerge from the pressure applying assembly and exit the camera.

In an illustrated embodiment, the method further comprises the step of connecting the respective sequential segments of film and the respective sequential segments of carrier sheet with respective flexible connecting means; and joining each sequential subassembly of film, connecting means, and carrier sheet by leader means.

In this illustrated embodiment, the method further makes provision for respectively pulling on the connecting means of each of said subassemblies by a corresponding pulling means so that the corresponding pair of film and carrier sheet of said subassembly is brought into intimate superimposed contact with each other as the pulling means is pulled from the camera through the pressure applying mechanism.

In another illustrated method, the step of dispensing the processing fluid is achieved by sequentially rupturing respective ones of a plurality of processing fluid reservoirs for dispensing the contents between a respective pair of superimposable film and carrier sheet prior to the pair being brought together by the pressure applying assembly.

In one preferred embodiment, each rupturable reservoir is connected to and displaceable with a corresponding pulling means for passing through the pressure applying assembly and being ruptured.

In the illustrated method, provision is made for separating each developed pair of film and carrier for forming separate and developed image carrying segments, each having at least a single developed frame.

In another illustrated embodiment, the method includes preventing subsequent development of sequential ones of the corresponding pairs of the film and sheet by preventing displacement of undeveloped pairs through the pressure applying assembly after a leading developed pair has already been pulled from the camera through the pressure applying means.

In the last embodiment, such method is carried out by a leader portion on a preceding subassembly cooperating with a leader portion on a subsequent subassembly, whereby both are interdicted in their movement such that a leading portion of an undeveloped subassembly within the camera is prevented from being pulled by an operator through the pressure applying assembly. Further, each leader portion includes a separable portion for facilitating separation of the imaging subassemblies.

There is also illustrated a method of sequentially processing individual exposable segments of photosensitive self-developing film in, preferably, a single use camera. One embodiment includes the steps of: providing a plurality of segments of exposable photosensitive self-developing film in a single use camera; providing a plurality of segments of carrier sheet in the camera; sequentially advancing corresponding and superimposable pairs of segments of film and carrier sheet through a pressure-applying assembly; selectively dispensing processing fluid between each corresponding pair of film and carrier sheet prior to passing through the pressure applying assembly, whereby the pressure-applying assembly spreads the processing fluid between corresponding pairs of film and carrier sheets as the latter are sequentially brought into a superimposed relationship for initiating development of the latent images as the respective pairs of film and the carrier sheet emerge from the pressure applying assembly and exit the camera.

Also according to the present invention, provision is made for a camera comprising a housing assembly including film exit means. Included in the housing assembly is a strip of photosensitive self-developing film; and a flexible strip of carrier sheet material. Provision is made for means for taking up the photosensitive film strip so that it passes an exposure station for exposure thereof and for storing the exposed photosensitive film strip. In this regard, there is also provided means for advancing the carrier strip and the exposed photosensitive film strip on the taking up means from the housing assembly through the exit means. Included is means for dispensing processing fluid between the exposed film strip and the carrier sheet. Pressure applying means are provided for applying pressure to the film and the carrier sheet for superimposing the photosensitive film relative to the carrier sheet following the dispensing of the fluid between the film and sheet for distributing and spreading the fluid over preselected portions of the exposed photosensitive film to develop the latent images and form an integral photographic film strip in response to the advancing means withdrawing the film and the strip through the exit means.

In an illustrated embodiment, provision is made for at least one of the photosensitive film or the carrier sheet having means thereon for establishing a processing fluid seal along the longitudinal edges of the superimposed strips for forming the integral film strip. In this illustrated embodiment, the sealing material can be a self sealing adhesive material.

In an illustrated embodiment, the carrier sheet is comprised of a transparent foldable sheet material over the developed images formed on the photosensitive film to form a unitary film strip with a series of developed images that can be cut into individual pictures.

In an illustrated embodiment, there is provision for dispensing means which includes a rupturable reservoir containing processing fluid. The reservoir is ruptured in response to passing through the pressure applying means.

In another illustrated embodiment, the photosensitive film and carrier sheet are joined in end-to-end relationship and coiled around a common supply spool assembly rotatably mounted in the camera housing assembly.

In yet another embodiment there is provided flexible hinge means interconnecting the photosensitive film and the carrier strip in the noted end-to-end relationship.

In still another embodiment, the advancing means includes a connecting pull tab member which has one end portion coupled to the hinge means, wherein the pull tab includes a slot for allowing the photosensitive film to pass therethrough as the film is being exposed.

In still another embodiment, the pressure applying means includes a pair of pressure applying spread rollers which are each journalled for rotation in a pillow block member, wherein the pillow block members are constructed for guiding the photosensitive film and sheet therepast; and for creating an edge guide for the film.

Essentially included in the camera apparatus is a housing assembly having an exit passageway; a sheet of photosensitive self-developing film; and, a carrier sheet material. Supply means is provided having consecutively wound thereon the photosensitive and carrier sheets. Included is hinge means for coupling one end portion of the photosensitive sheet to the carrier sheet. Further included is a take-up means connected to another end portion of the photosensitive sheet for unwinding at least the photosensitive sheet from the supply means for thereby allowing sequential exposure of the photosensitive sheet at a camera focal plane. Provision is made for a second means operably connected to the hinge means and being displaceable exteriorly of the housing assembly, by an operator, for unwinding the exposed photosensitive sheet from the take-up means and the carrier sheet from the supply means. A rupturable reservoir of processing fluid containing processing fluid is connected to the second means and is displaceable between the carrier sheet and said photosensitive material. Provision is made for pressure applying means for rupturing the rupturable reservoir and spreading the processing fluid to and between the photosensitive and carrier sheet as the latter advance through the pressure applying means in response to the hinge means being displaced through the pressure applying means by the second means.

In an illustrated embodiment, the tab means interconnects the carrier and photosensitive sheets together and includes a passage therein through which the photosensitive film passes.

In an illustrated embodiment, provision is made for an exit passageway in the housing assembly for allowing exiting of the carrier and photosensitive sheets therefrom.

In another illustrated embodiment, the rupturable reservoir is connected to the hinge means so as to be ruptured by and between the pressure applying means.

In another illustrated embodiment, the pressure applying means includes a pair of pressure-applying spread rollers which are mounted in a pair of pillow block members. The pillow block members are arranged to form edge guides for the passing film and sheet.

In yet another illustrated embodiment, the carrier sheet is provided with a tab which is arranged to engage the hinge means for forcing the reservoir into the pressure applying means so as to rupture the same.

Among the other objects and features of the present invention are the provisions of a single use camera and method which processes the self-developing film therein; the provision of an improved single use camera and method in which the self-developing film is processed in response to having a self-developing photosensitive film and a carrier sheet brought into face-to-face relationship after processing fluid has been dispensed to and between the film and the carrier sheet; the provision of processing the film and the sheet in response to an operator pulling the film and the carrier sheet from the camera; the provision of an improved film assemblage for use preferably in a camera of the single use type; the provision of the noted film assemblage having a plurality of image forming segments capable of being exposed and processed independently and sequentially, in response to an operator withdrawing the assemblage from the camera; and the provision of a film assemblage having the image forming segments or elements separable.

Other objects and advantages of the present invention will become apparent from the following more detailed description thereof when taken in conjunction with the accompanying drawings in which like structure is represented by like reference numerals throughout the several views.

BRIEF DESCRIPTION OF THE DRAWINGS

FIG. 16 is a diagrammatic view of still another embodiment of a pull tab mechanism;

FIG. 17 is a diagrammatic view of yet another embodiment of a pull tab of the invention;

FIGS. 18–20 are diagrammatic views of another embodiment of a pull tab mechanism;

FIG. 30 represents a schematic of an improved film assemblage made according to the principles of the present invention;

FIG. 31 is a fragmented exploded perspective view of one component of the film assemblage;

FIG. 32 is an exploded side elevational view, partly in section, of a joint made according to the principles of the present invention;

FIG. 33 is an enlarged fragmented view of another joint component of the film assemblage;

FIG. 34 is a perspective view of a leader segment of the film assemblage;

FIG. 35 represents one arrangement of film and pull tabs in an initial at rest configuration;

FIG. 36 represents an enlarged fragmented portion, with portions omitted for clarity, of another aspect of the camera;

FIG. 39 is a view similar to FIG. 38, but with the components in yet another position during operation;

FIG. 40 is a view similar to FIG. 39, but with components and still a further depicted position during operation;

FIGS. 41 and 42 represent the components in yet further positions during operation;

FIG. 43 represents the position of the components following separation of one of the film subassemblies;

FIGS. 45 and 46 represent still further depictions of the components during subsequent steps of the operation of the camera.

DETAILED DESCRIPTION

Figure 1:
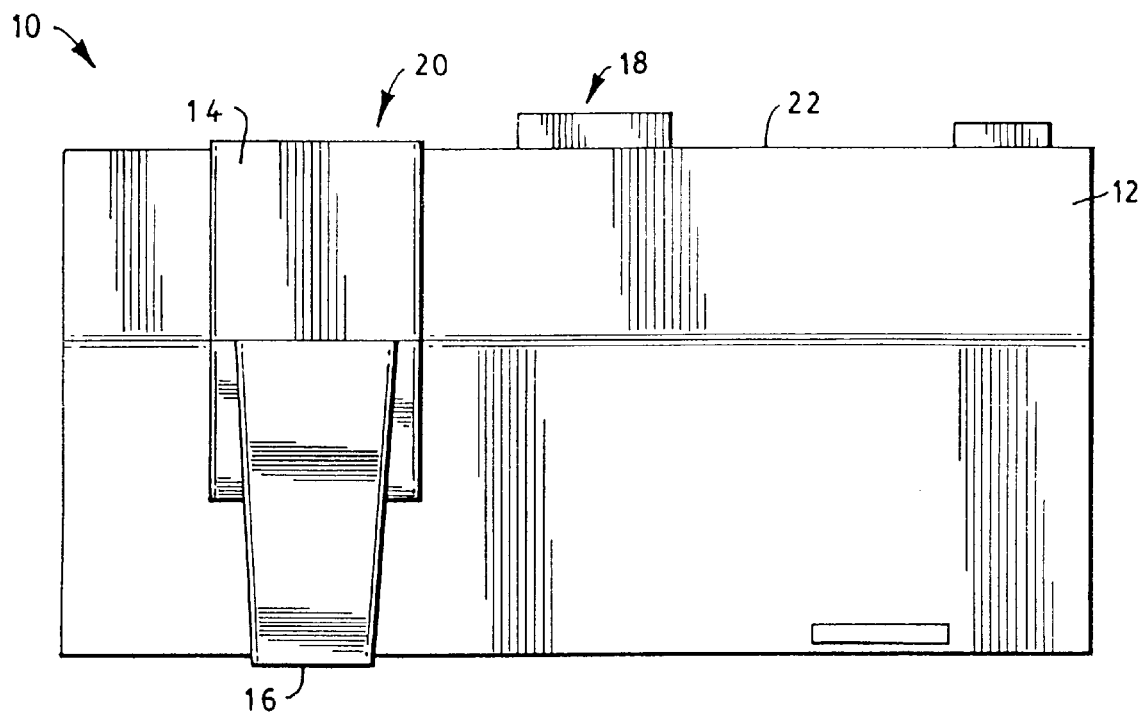
FIG. 1 is a top plan view of one form of camera illustrative on an embodiment of the invention.
Figure 2:
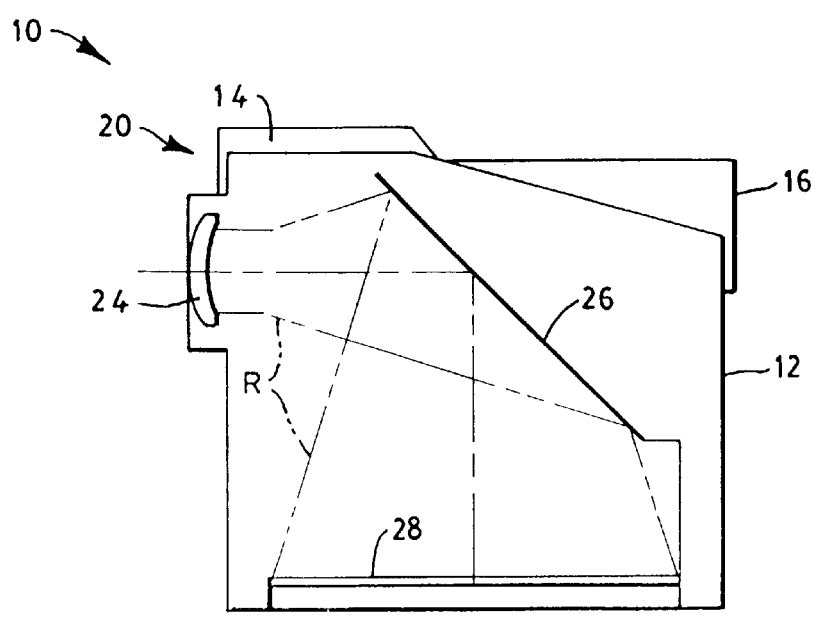
FIG. 2 is a diagrammatic side elevational view of the camera of FIG. 1, with scene light travel through a lens and onto an exposure plane.
Figure 3:
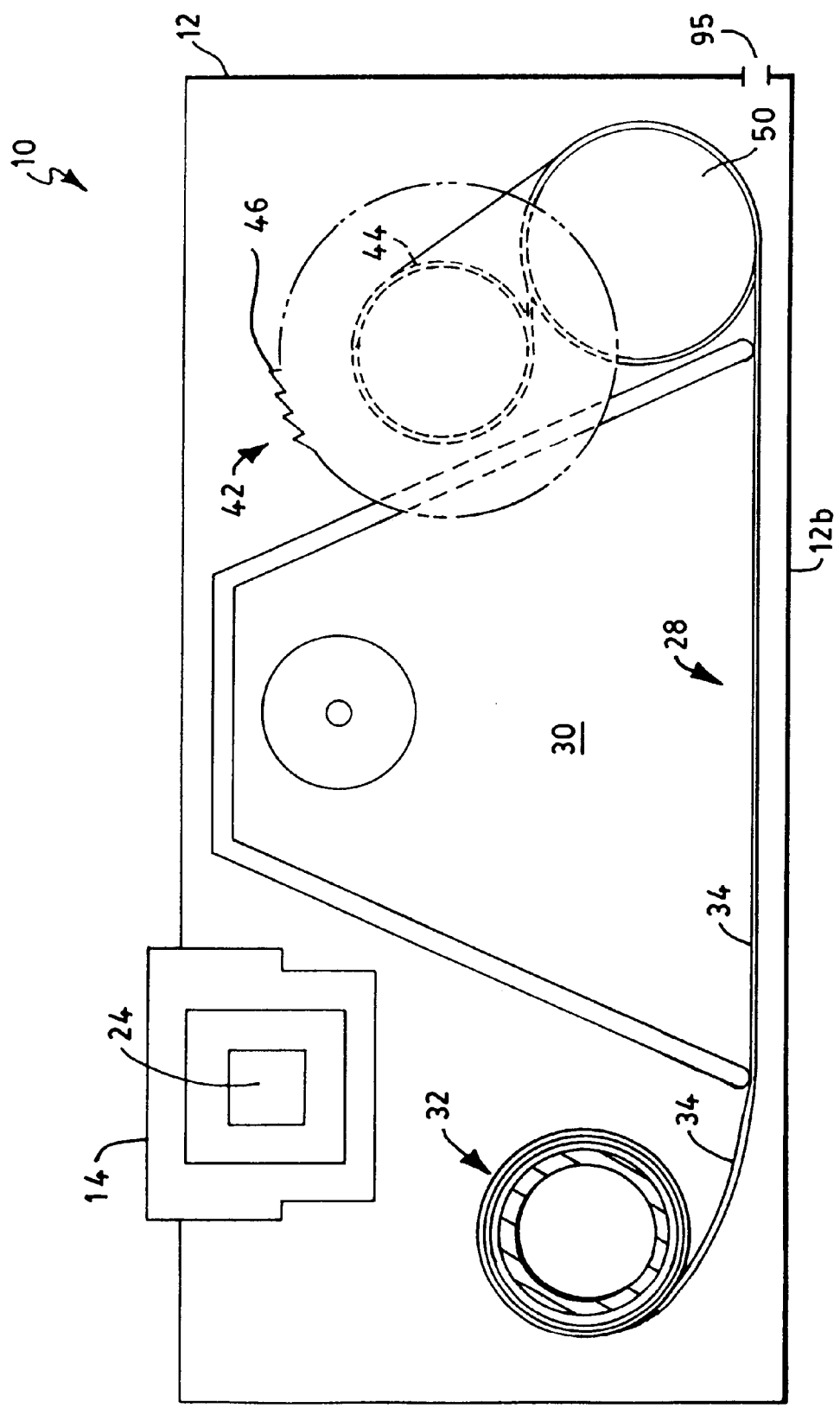
FIG. 3 is a rear elevational view of the camera of FIGS. 1 and 2, with a rear cover removed to show some of the working components of the camera.
Figure 3A:
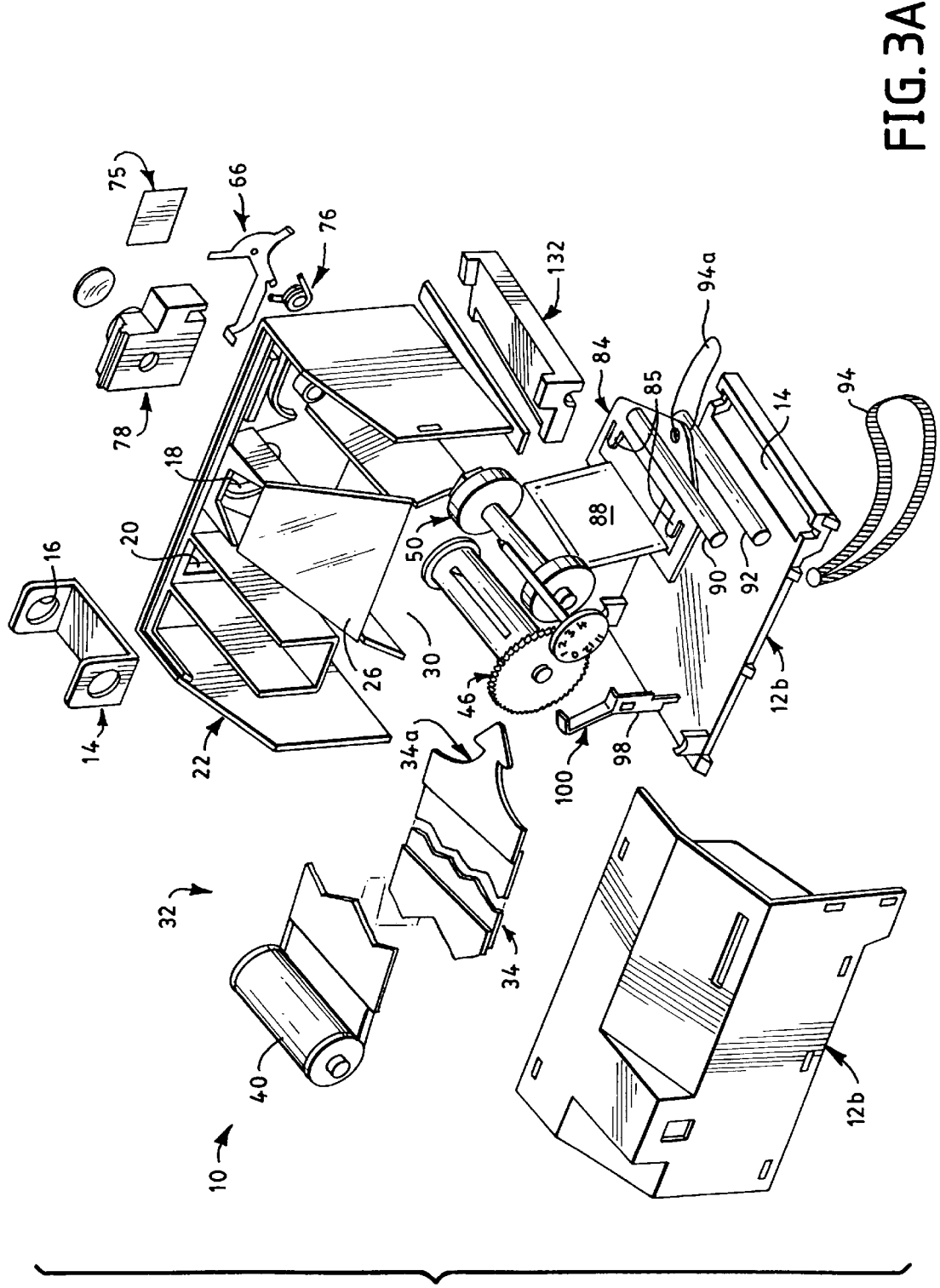
FIG. 3A is an exploded perspective view of the camera.

Referring initially to FIGS. 1 to 3A, there is illustrated one preferred embodiment of a single use camera 10. The camera 10 includes a lighttight camera housing or film package 12 which can be made of a variety of suitable materials and a viewfinder 14 having an eyepiece 16 extending rearwardly therefrom. An objective lens opening 18 and a viewfinder window 20 are disposed in the front and base block 22 of the camera. As best shown in FIG. 3A, the housing assembly 12 includes a back cover 12a and a bottom cover 12b. An objective lens 24 is disposed adjacent the lens opening 18 (FIG. 2) and is adapted to direct image-carrying light rays R to a mirror 26. The mirror 26 reflects the light rays onto a film plane 28 in an exposure chamber 30, which plane constitutes an exposure area. As will be explained, a negative strip of film will be advanced through the exposure chamber 30, whereby it can be exposed sequentially. The camera 10 shares many similar aspects to that described in U.S. Pat. No. 5,453,804 such as the exposure control and power supply which description is incorporated herein by reference.

Figure 4:
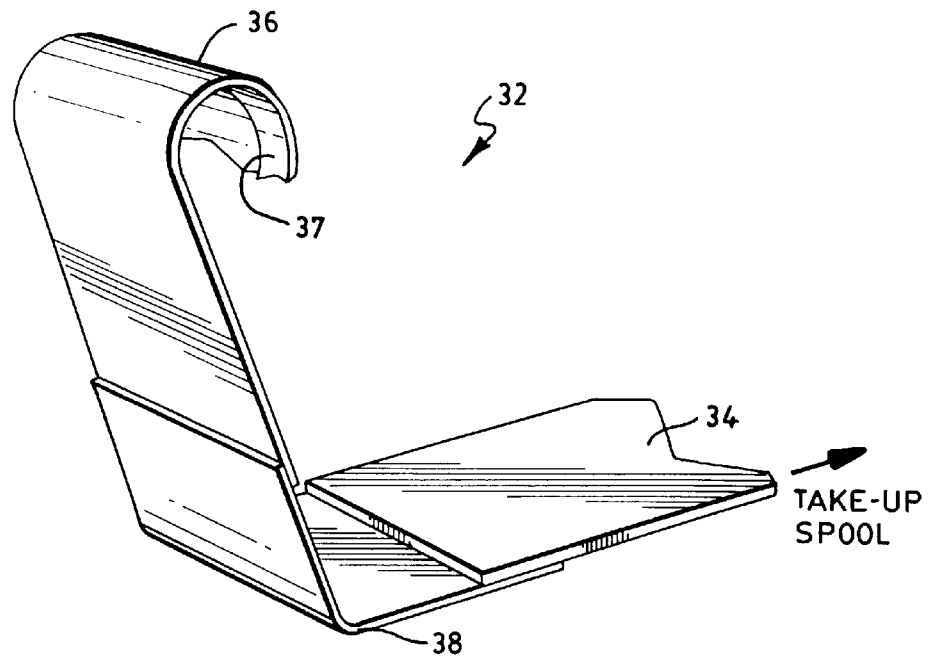
FIG. 4 is a fragmentary view of a film system usable in the camera of the present invention.
Figure 29:
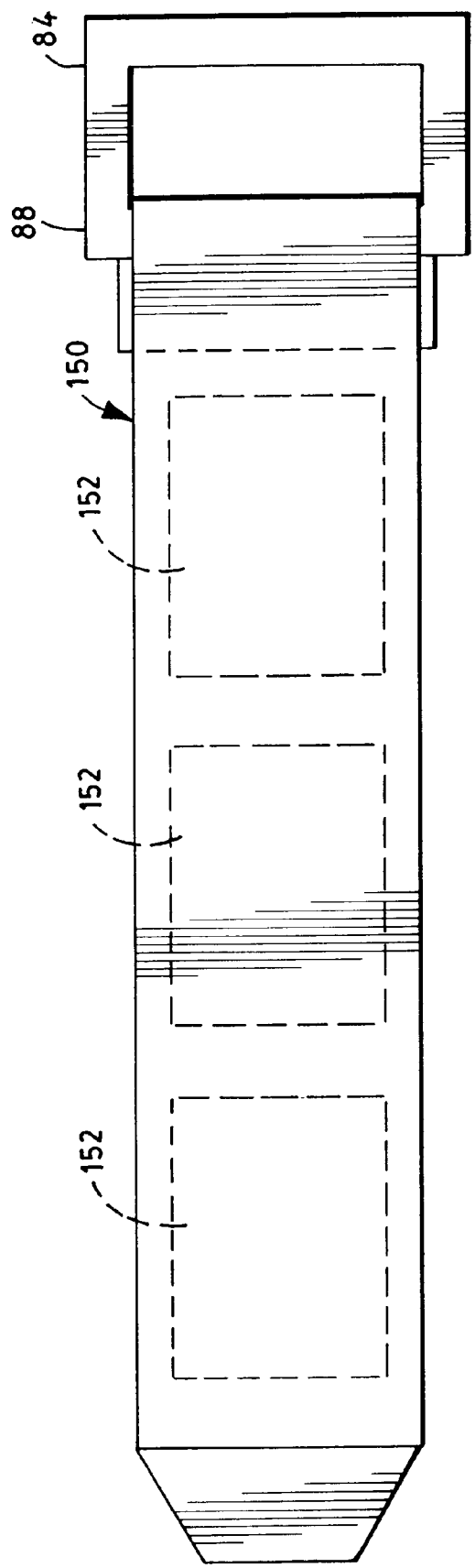
Figure 37:
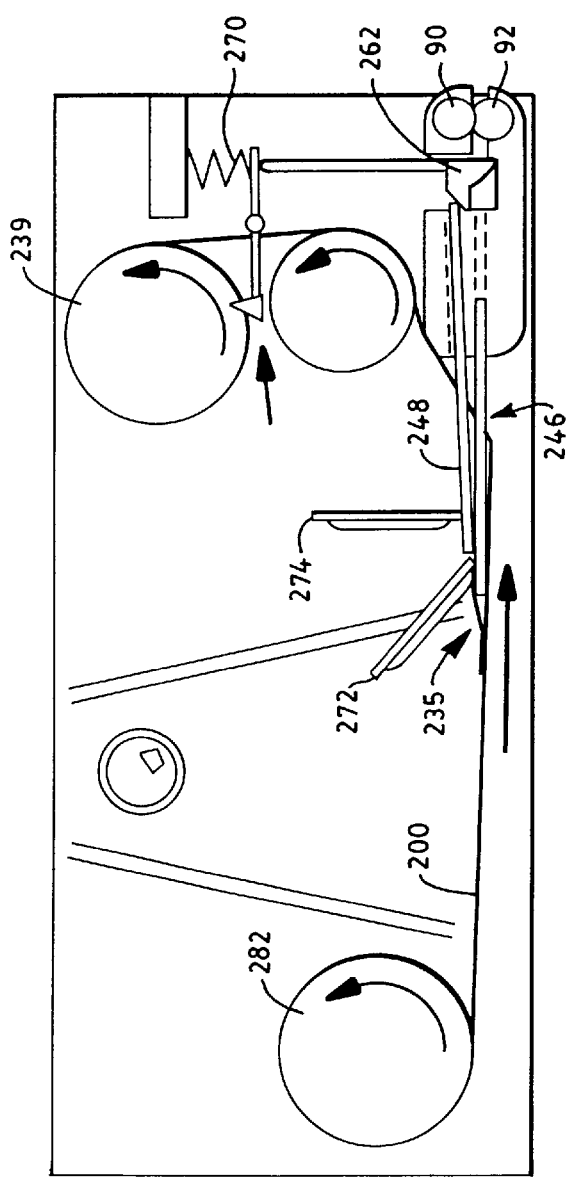
FIG. 37 is a schematic representation of the camera components during one aspect of the operation.
Figure 38:
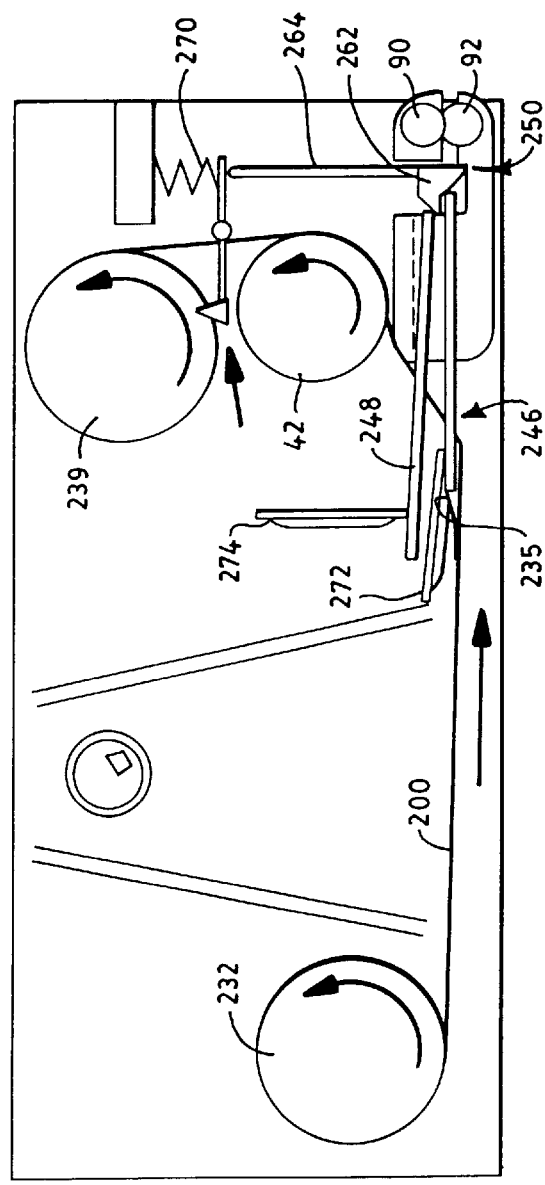
FIG. 38 is a view similar to FIG. 37? but representing the components in yet a different position during operation.
Figure 44:
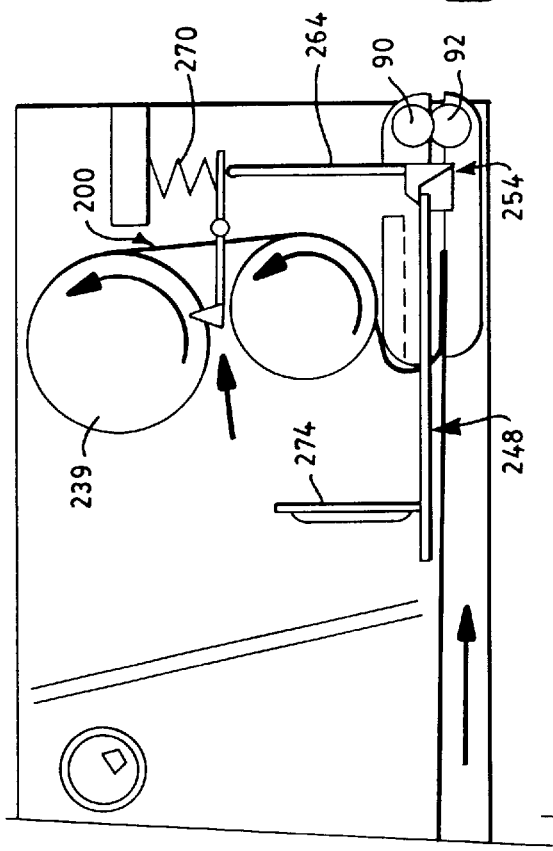
FIG. 44 represents the components of the camera in yet another position during operation.
Figure 45:
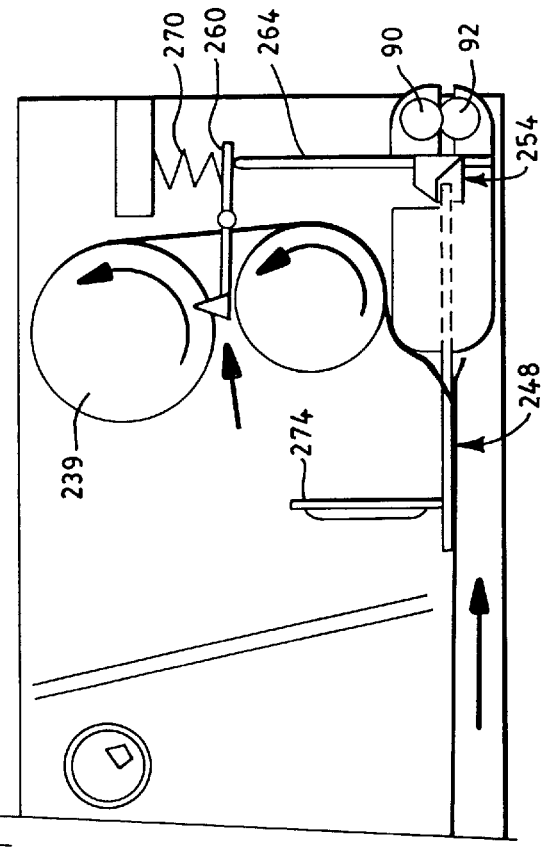

The single use camera 10 is adapted to operate with a variety of self-developing film systems 32 in which a container of processing fluid is actuated in order to dispense a processing fluid reagent for initiating processing of such a film. Reference is made to FIG. 4 for illustrating one preferred embodiment of such a film system. In this embodiment, the film system 32 essentially includes an integral negative or photosensitive film strip portion 34, a strip of carrier sheet 36, as well as a foldable hinge portion 38 which interconnects the negative strip to the carrier strip. The photosensitive film strip portion is of a length such that it can handle a plurality of longitudinally spaced latent images. The hinge 38 is made of a flexible material, such as a polyethylene coated foil, a thin polyester film, a heat sealed coated foil, or paper and acts to couple the carrier to the photosensitive portion. This type of self-developing film is adapted to have a processing fluid applied to and between superimposed surfaces of the negative and carrier strips for initiating developing process of the latent images. The processing fluid initiates self-development in a well known process in the photographic arts of the latent images in the exposed negative strip to an image receiving layer in the carrier sheet 36. It will be further appreciated that the carrier strip 36 may or may not include an image-receiving layer, but in this embodiment the carrier strip 36 includes the image receiving layer and a polyester sheet. In this regard, such a carrier sheet incorporates an image-receiving layer which is described in commonly assigned U.S. Pat. No. 4,605,608 and such description is incorporated herein as a part hereof. Thus, the carrier can be an integral part of the final photographic film strip 150 (FIG. 29) with a series of processed images 152. A carrier sheet having a mordant on it can be peeled away or the carrier sheet may merely assist in spreading the processing fluid on the photosensitive sheet. It will be understood that in a peel-a-apart application the mordant and a release layer can be on a paper base or a non-transparent base carrier, such as a suitable pigmented polyester one example of which is MELINEX™ that is commercially available. It will be understood that a mirror is not necessary for reversing the image in this peel-apart application. Still another approach encompasses an integral film format wherein the photosensitive sheet includes a transparent negative base having a mordant and photosensitive layers separated by at least a pigmented layer through which the dyes transfer. In this system there is also s no need for a mirror for reversing the image during exposure.

In this embodiment, there is provided a pair of rails 37 which are attached to the longitudinal edges of the carrier strip 36. The rails assist in establishing a developer thickness gap between the adjacent strips. The carrier sheet is, preferably, a polyester material which is transparent. However, the carrier sheet need not be made of materials which are transparent, but can be made of opaque materials as well. While the illustrated embodiment shows the rails on the carrier strip 36, it will be appreciated that the rails can be attached to the negative as well. In order to make an integral film unit the present invention contemplates having the top surfaces of the rails covered with an adhesive of the self-sealing type, such as a water activated ~s adhesive as gelatin, a copolymer of maleic acid, a methylvinylether or HEC (hydroxyethylcellulose), or starch based material. In addition, other self-sealing materials, include pressure-sensitive tapes can be used. This adhesive will rapidly seal the edges against the processing reagent; thereby preventing leakage. The longitudinal rails control the spreading of the processing fluid between the strips. The innermost end 20 of the positive may have a trap zone and a tear strip zone may be on the negative's opaque leader, preventing further progress through the spread rolls and trapping excess processing reagent in the camera as the unitized picture strip is pulled free from the take-up roll. In this embodiment, the negative and carrier strips which are in face-to-face contact with the reagent containing material, such as styrene butadiene which will cause the strips to remain permanently laminated to each other so that the user can later cut the pictures on the strip into individual frames. Although the illustrated embodiment, has the carrier sheet joined to the photosensitive sheet, the present invention also contemplates that the carrier can be removed from the developed negative and the latter cut into individual frames. An example of this latter approach is described in commonly assigned U.S. Pat. No. 4,370,045 issued Jan. 25, 1983 in which 35 mm instant type transparency is used. It will be understood that the structures of the photosensitive materials can be like those of the various kinds of self-developing film presently known.

A storage or supply spool assembly 40, as viewed in FIGS. 3 and 3A, is journalled for rotation in the camera housing 12 adjacent one side of the exposure chamber 30 and has the unexposed film system 32 wound thereon. The film system 32 will gradually unwind from a means for supporting the elongated film system in the form of a roll, such as a supply spool assembly 40 during exposure and developing modes of operation; as will be explained hereinafter. Although this embodiment illustrates that the entire film system 32 is mounted on the supply spool assembly, it will be appreciated that the film system can be stored in a variety of ways. For example, the film system can be stored as by being placed in a suitable cassette or stored in a serpentine folded condition in a film magazine or the like. Also, this invention contemplates having negative and covering sheets stored separately and subsequently merged in a face-to-face manner for effecting the developing of the exposed film in a manner consistent with the teachings of this invention.

Figure 5:
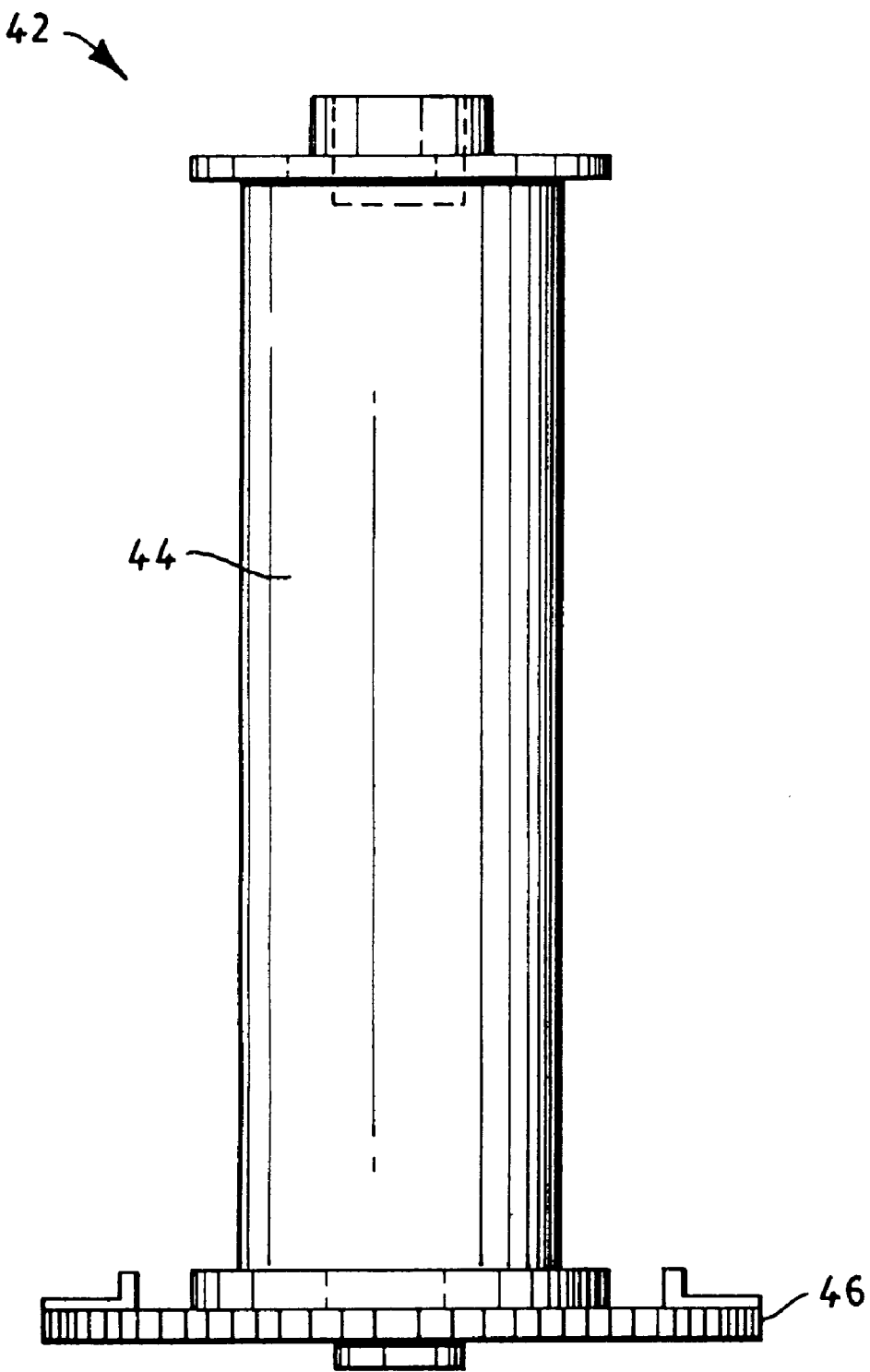
FIG. 5 is a side elevational view of a film take-up spool used in the camera.

Reference is now made to FIGS. 3, 3A & 5, for illustrating a film take-up spool assembly 42 that has a leader 34a of the negative film strip attached thereto. Rotation of the film take-up assembly 42 results in unwinding of the film system 32 from the supply spool assembly 40 and advancement thereof through the exposure chamber 30. In this connection, the take-up assembly 42 includes a take-up spool 44 having its opposite axial end portions rotatably journalled (not shown) in the housing 12. The take-up assembly 42 is located on a side of the exposure chamber 30 that is opposite the supply spool assembly 40. For rotating the take-up assembly, a ratchet wheel 46 is fixedly connected to one end of the take-up spool 44 and is at least partially exposed to the exterior of the camera housing 12 for facilitating user rotation thereof.

Figure 7:
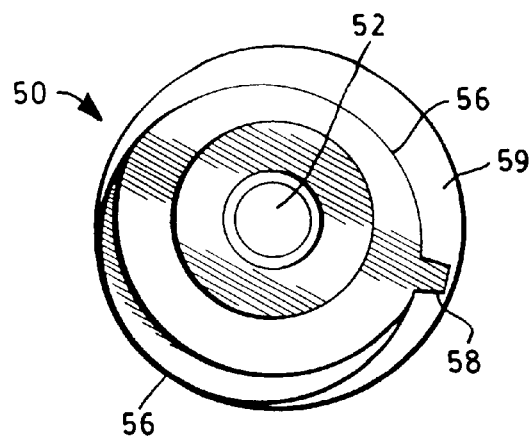
FIG. 7 is an end elevational view of the meter roll shown in FIG. 6.
Figure 6:
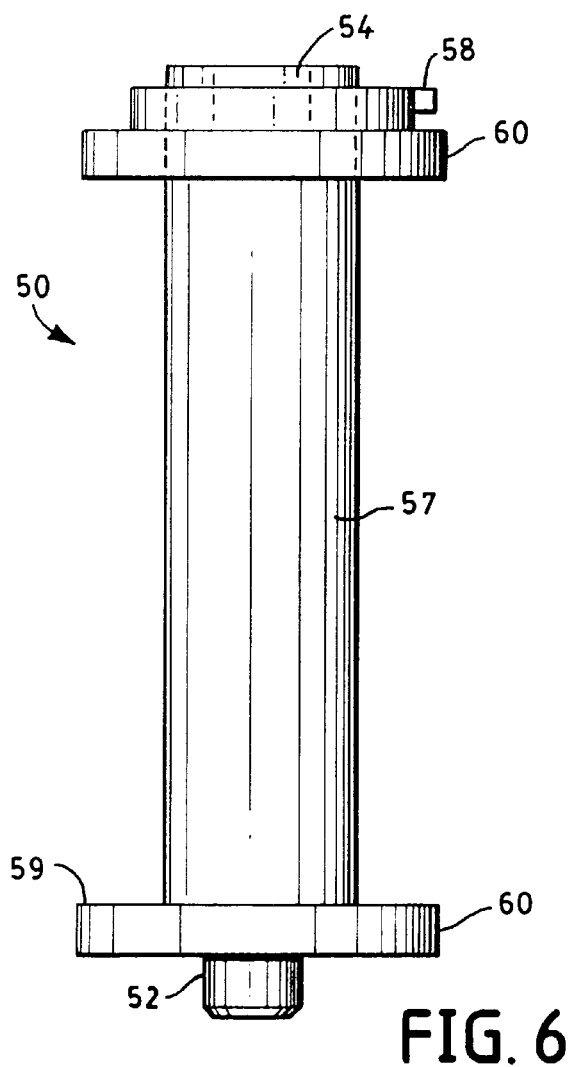
FIG. 6 is a side elevational view of a meter roll used in the camera.

FIGS. 6 and 7, depict a cylindrical metering roll 50 having a journal 52 at one end and a journal bearing 54 at its opposite end for rotatably supporting the roll. The metering roll 50 is located in a closely spaced and generally parallel relationship to the take-up spool 44; such that when the film system 32 is wound onto the take-up spool it winds around the metering roll. A cam 56 and a radially extending detent 58 are formed on the journal surface as illustrated. The metering roll 50 includes a spool shaft 57 having a pair of spaced friction wheels 59 thereon which support the longitudinal edges of the film. In addition, a cylindrical surface of each of the fraction wheels 59 is provided with a high-friction elastomeric coating 60, such as made from urethane, neoprene, and silicone rubber. The coating 60 frictionally engages, in a non-destructive manner, one surface of the film system 32, whereby the advancing film imparts rotational movement to the metering roll 50. Rotation of the metering roll 50 results in corresponding rotational movement of the detent 58; which rotation is stopped when the detent engages a stop lug 62 on a shutter recocking mechanism 64 (FIGS. 9–12). As a consequence, resistance to manual turning of the ratchet wheel 46 is encountered; thereby indicating to the user that the film system has been properly indexed for another exposure. The interaction of the meter roll and the shutter recock align precisely the next film segment of the film within the exposure chamber 30.

Figure 9:
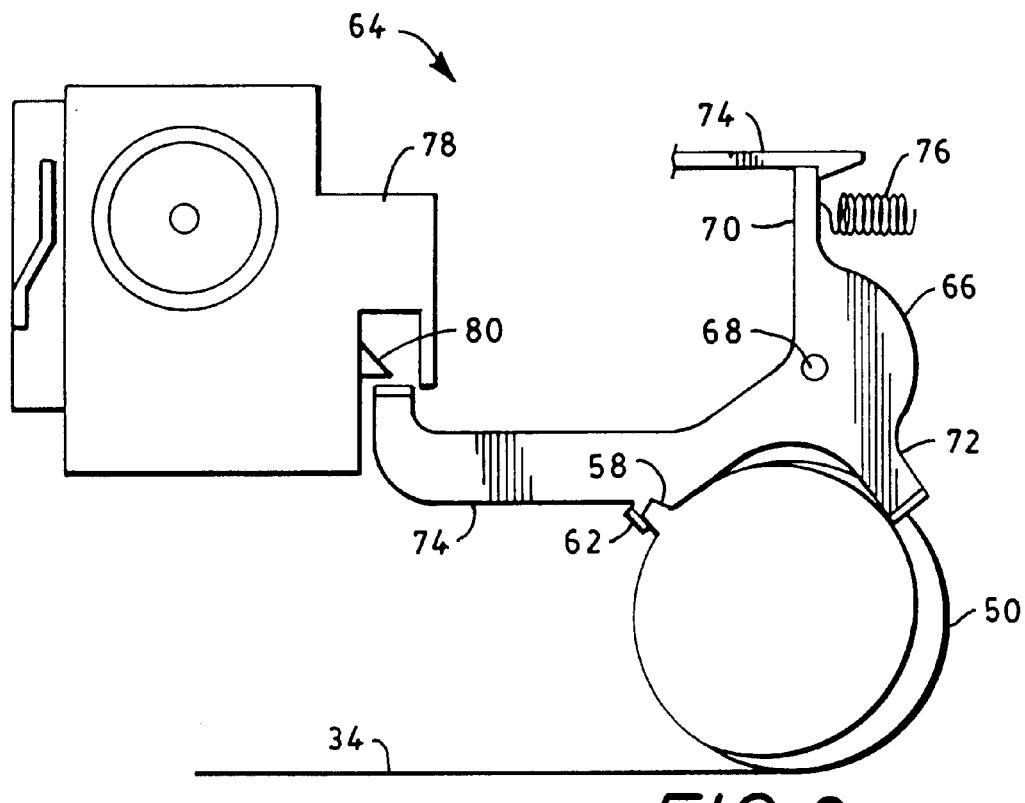
FIGS. 9–12 are elevational and partly diagrammatic views illustrative of a shutter recock mechanism structure and operation.
Figure 10:
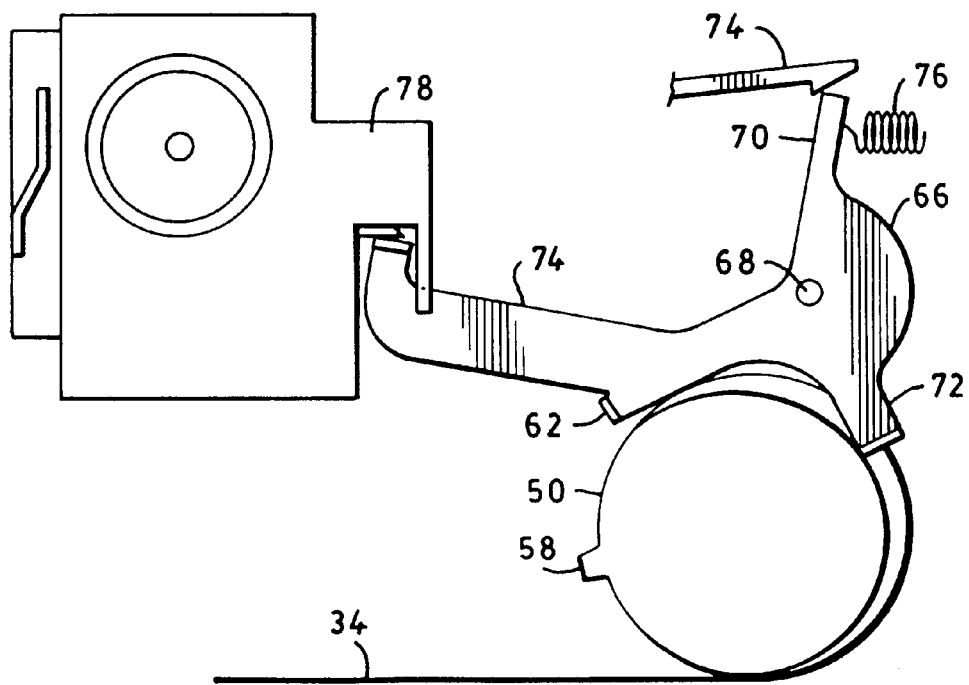
Figure 11:
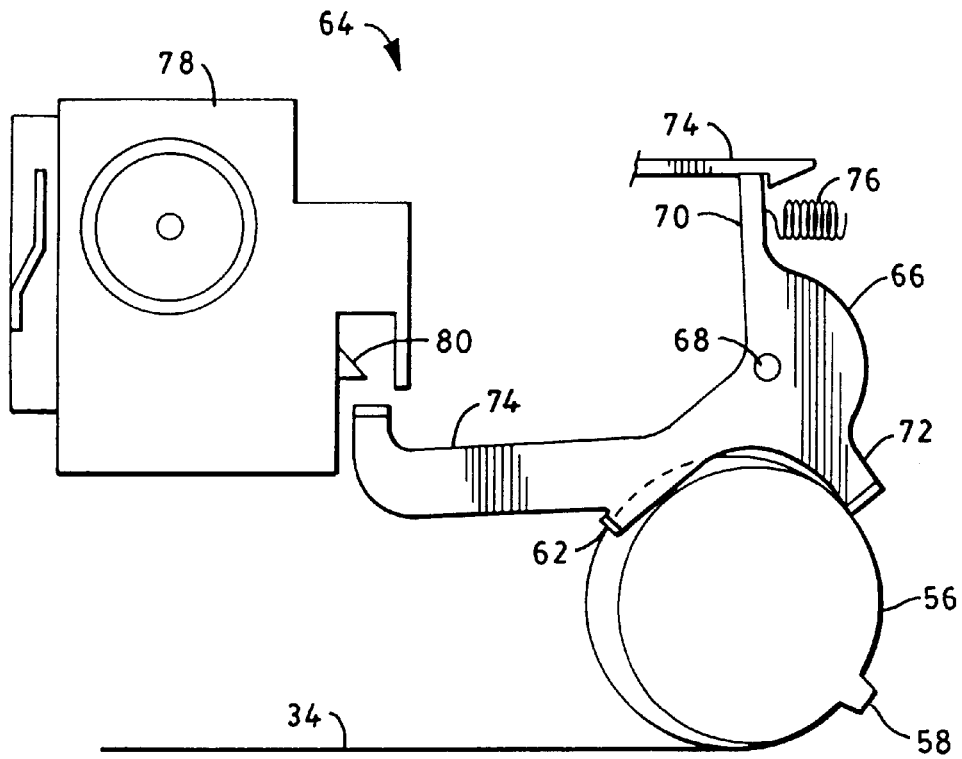
Figure 12:
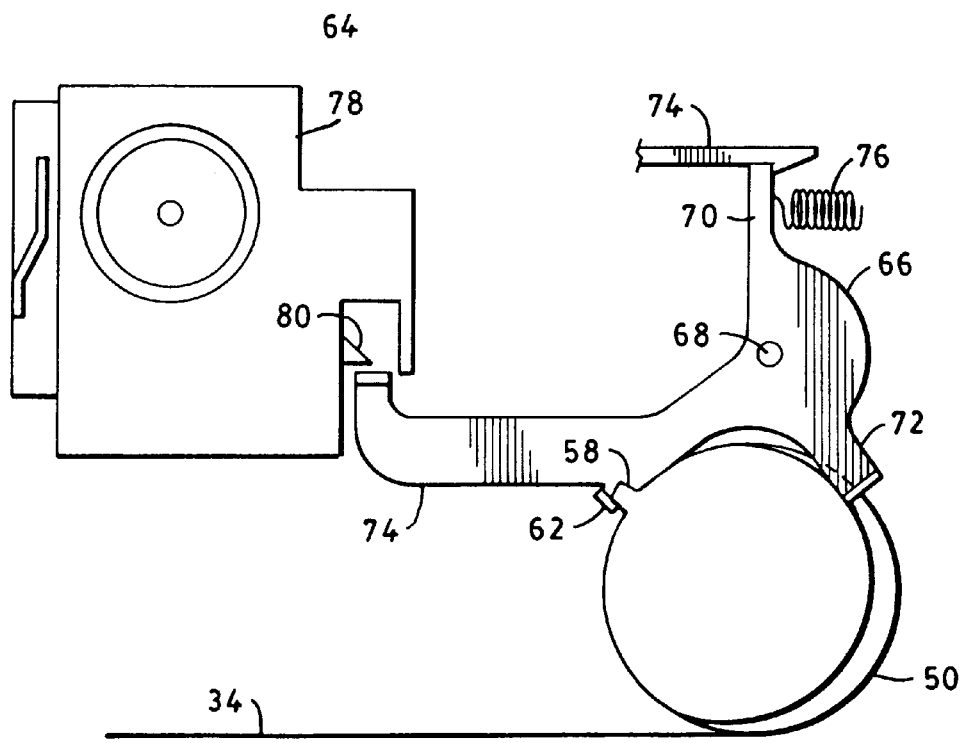

As shown in FIGS. 9–12, a hammer 66 is pivotally mounted on a pin 68 extending inside the camera housing. The hammer 66 includes the stop lug 62, a release arm 70, a recock arm 72, and a shutter blade actuator arm 74. As illustrated in FIG. 9, the release arm 70 is engaged with a release button 75 by which an operator triggers exposure of a segment of a negative film strip. The release arm 70 is biased in a clockwise direction as viewed in FIGS. 9–12, by spring means 76. Positioned proximate the hammer 66 is a shutter assembly 78 actuated by a shutter blade 80 extending from the shutter assembly.

Figure 25:
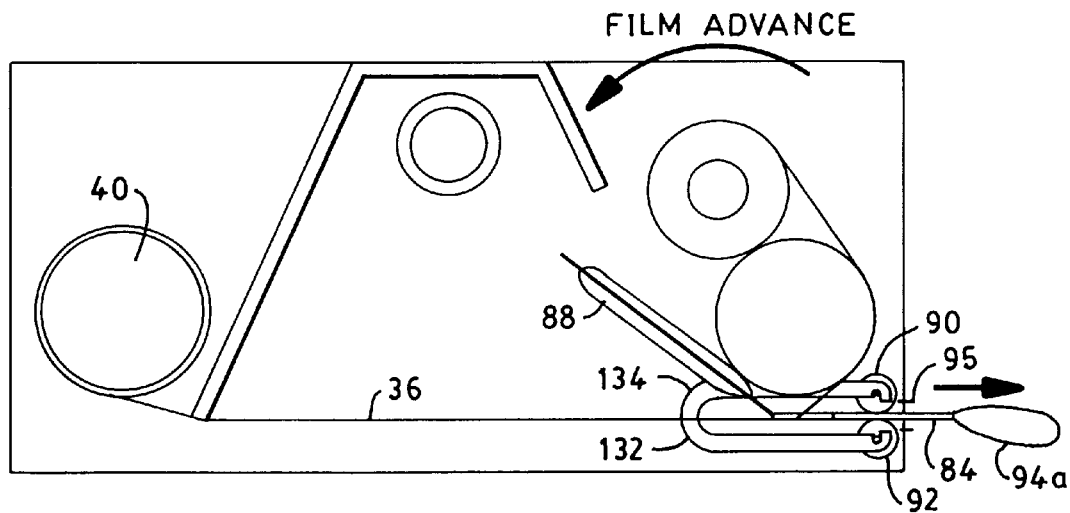
Figure 26:
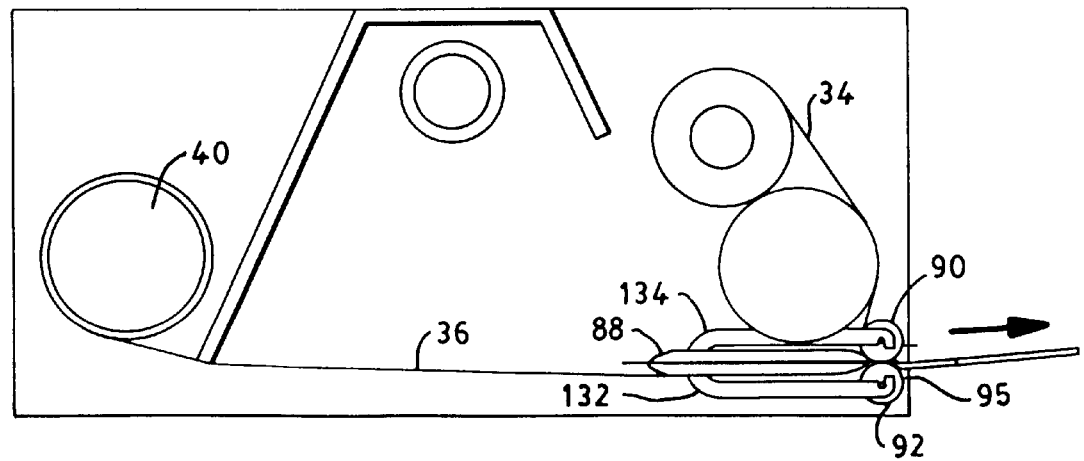

Upon actuation of the release button 74, the release arm 70 is released and in response to the bias of the spring means 76 rotates with the remainder of the hammer 66 in a clockwise direction around the pin 68. Such rotation moves the actuator arm 70 into engagement with the shutter blade 80 to trip the shutter and expose the segment of the film strip located within the exposure area. Simultaneously, the stop lug 62 moves away from the meter roll detent 58 to permit counter-clockwise movement of the meter roll 50 (FIGS. 24-26) and thereby permit counter-clockwise rotation of the take-up spool 44.

The operator then engages the exposed portion of the ratchet wheel 46 (FIG. 1) to turn it and thereby the take-up spool 44 in order to move the just exposed film segment from the exposure area 30 and also unwind another segment of the negative into the exposure chamber. Rotation of the metering roll 50 causes turning of the cam surface 56 (FIG. 9) which abuts the recock arm 72 and rotates the hammer 66 to a recock position as shown in FIG. 9 wherein the release arm 70 is spaced from but positioned to engage the shutter blade 80. After further rotation of the meter roll 50, the detent 50 reengages the stop lug 62 (FIG. 10) to stop rotation of the meter roll, thereby halting further film advancement. In this latter position, the shutter recock mechanism 64 is set for another exposure of the film and the latter is properly located within the exposure chamber.

Figure 8:
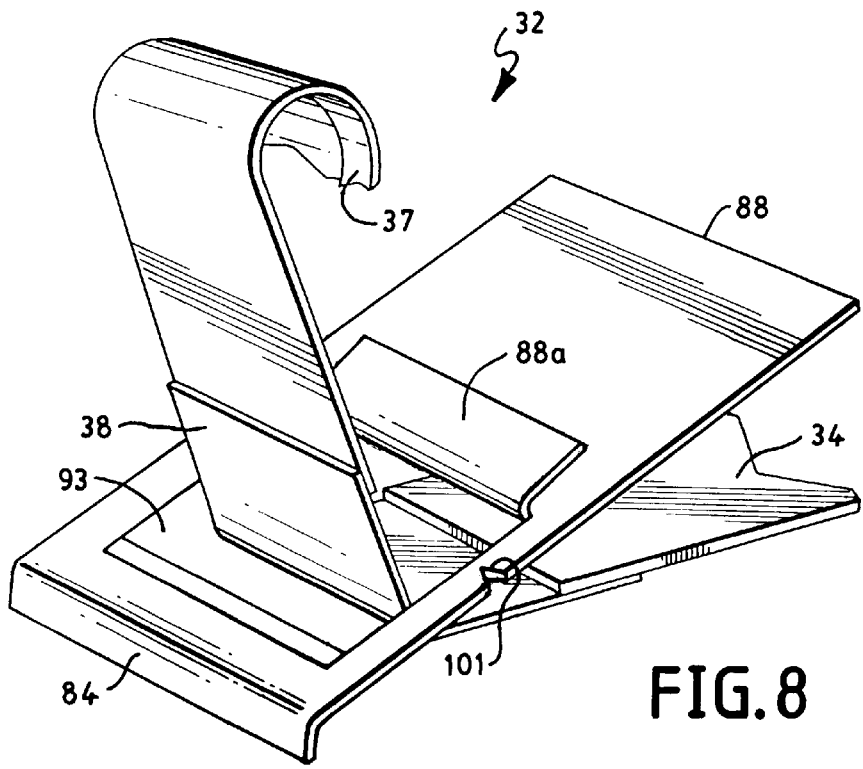
FIG. 8 is fragmentary view of one embodiment of a pull tab member used in conjunction with the film system of the present invention.

Reference is now made to FIG. 8 for illustrating a film processing actuating means or assembly 82 for initiating development of the exposed film. The actuating assembly 82 includes an elongate pull tab member 84 that is to be pulled by the user from outside the camera, as will be described, for initiating film processing. In this s embodiment, when the pull tab 84 is pulled it advances the exposed negative strip 34 from the take-up spool 44, and simultaneously advances the carrier strip 36 from the supply spool assembly 40; whereupon both are merged into face-to-face contact together in a pressure applying means, such as a spread roller assembly 86; see FIGS. 24–26. As a result of such pulling action, the interior surfaces of the negative and the carrier strips are brought together in superimposed relationship. Also, during such actuation, a processing fluid containing means, such as a rupturable pod 88 comes between the negative and carrier strips and travels between the spread roller assembly 86 so that the pod is ruptured and the processing fluid dispensed and spread in a uniform layer therebetween. As a consequence, the entire length of the exposed negative strip 34 has the fluid spread therebetween as the film exits the spread roller assembly 86 and the camera housing 12. As a result, there is provided an integral developed film unit containing a plurality of developed exposures which can be cut into individual frames by a user. While use of the pod 88 is preferred, it will be understood that this invention contemplates other fluid containing and dispensing devices and methods for dispensing on demand processing fluid between the negative and carrier strips.

The pull tab 84 is a relatively thin and flat metal body that is initially situated in the nip of a pair of spread rollers 90, 92 forming part of the spread roller assembly 86. The pull tab is adapted to have its end portions supported in the housing. The pull tab 84 establishes a pregap for the rollers when the camera is in its pre-processing mode. A transversely oriented opening 93 formed in the pull tab allows the negative film strip 34 and the hinge portion 38 to pass easily therethrough as the latter are advanced to the take-up spool 44. This facilitates advancement of the negative strip 34 as well as advancement of the carrier strip 36. In this embodiment, the pull tab 84 can be further attached to a tab pulling element, such as a finger loop 94 (FIG. 3A). In the tab embodiment shown in FIG. 3A there is illustrated a tab which has a pair of spring biased tabs 85 which are constructed to engage and load the longitudinal margins of the negative against the metering roll as well as provide a lead in for even more positively engaging a flap, described below, of the carrier sheet. The finger loop will not be accessible to the user from the 15 camera exit slot 95 until the tab is pushed outwardly from between the roller nip. A wrist strap 94a (FIGS. 3A~25) is attached to a center portion of the camera cover 12b. It will be appreciated that the slot 95 allows egress of the pull tab 84, as well as the entire film system 32 during film processing. The wrist strap 94a provides self-aligning functions for the pulling forces on the exiting film so that the resultant pulling forces are generally transmitted along a longitudinal axis of the tab regardless of the angle at which the loop is held. In addition, the wrist strap 94a serves as a carrying device for the camera. While a finger loop is preferred for pulling the tab and the film from the camera, it will be appreciated that a variety of devices can be used including an elongated portion of the pull tab itself.

Figure 27:
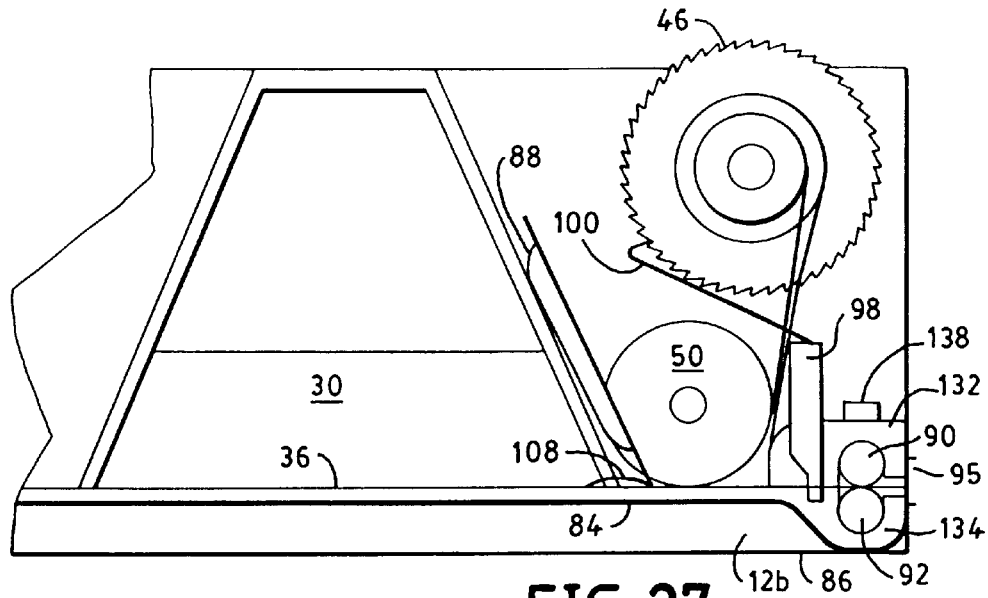
FIG. 27 is a diagrammatic view of an embodiment showing a pull tab securing mechanism of the present invention and its spread rollers.

As shown in FIG. 27, a tab finger 94 is provided for releasably securing the pull tab 84 in the camera housing 12. The tab finger 98 frictionally engages a notch 101 (FIG. 8) formed along a longitudinal edge of the pull tab 84. A pawl 100 is pivotally connected to the opposite end of the tab finger 98 for engaging teeth on the ratchet wheel 46, thereby holding the latter against clockwise rotation. However, the restraining forces exerted by the spread roller system are overcome upon the requisite pushing forces being exerted on the pull tab 84 by a flap on the hinge. When the pull tab is horizontally pushed outside the camera, it causes the finger 98 to pivot which in turn retracts the pawl 100 from engagement with the ratchet wheel 46. As a result, the take-up spool 44 is free to rotate in an opposite rotational direction upon continued pulling by the user on the pull tab. Accordingly, the exposed negative can be unwound from the take-up spool. While a tab finger 98 contacting the pull tab 84 is depicted, it will be appreciated that other tab restraining and releasing mechanisms, such as an overcenter spring can be used instead.

In this embodiment, the film system 32 is of such a length that when the negative has been fully exposed the film system is of such a length that the flexible hinge 38 is located within the tab opening 93. Accordingly, when a user pulls on the pull tab 84, the hinge 38 is also pulled through the spread rollers 90, 92 as well as the pod and both the negative strip 34 and the carrier strip 36. The pod is burst and its contents are spread evenly between the strips 34 and 36 which merge in a superimposed manner as they pass through the spread rollers. The hinge 38 is made of a material which possesses strength for transmitting the pulling forces on the strips 34, 36.

Figure 24:
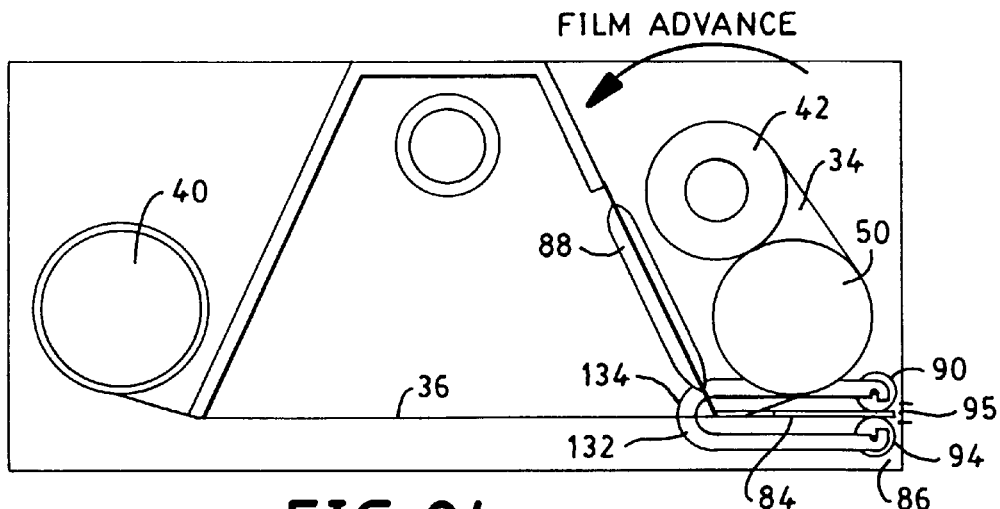
FIGS. 24–26 are elevational and partly diagrammatic views of the processing steps of the present invention.

Reference is made back again to the pod 88 which in this embodiment is attached at a proximal end, by a flexible strip 88a as by an adhesive, along a trailing edge of the pull tab 84. The pod 88 by being attached to the pull tab 84 is also movable into the bite of the spread rollers 90, 92 before the negative and the carrier strips are merged together into intimate juxtaposed relationship with one another. The pod 88 is constructed of rupturable material and with a sufficient volume of processing reagent therein so as to be capable of dispensing a desired amount of the processing fluid over an entire length of the film system 32. The distal end of the pod 88 is movable and can be stored in a variety of positions, such as depicted in FIGS. 24 & 27, so as to fit compactly within the housing assembly 12.

Figure 13:
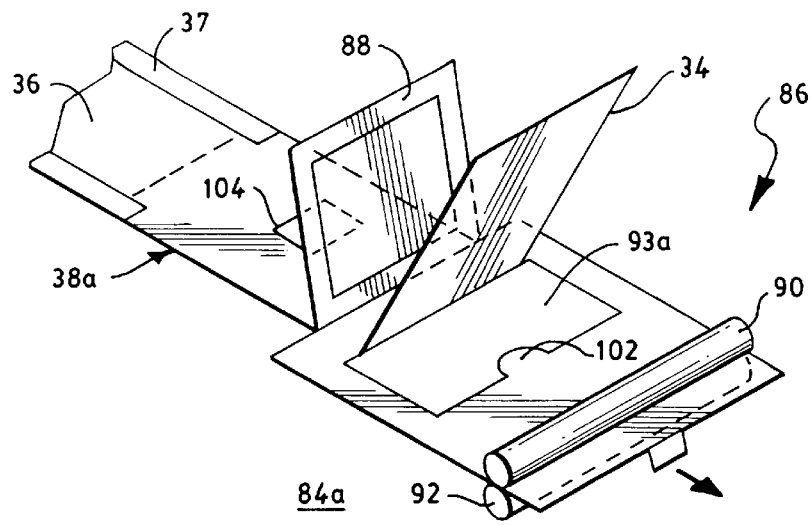
FIG. 13 is a diagrammatic view of an embodiment of a pull tab mechanism usable with the film system.

Reference is made to FIG. 13 for illustrating another embodiment wherein the pull tab 84a has a post 93 extending into the opening 93a. The pull tab 84a is initially maintained in the nip of the spread rollers and the post 93 extends through a hole 104 in the hinge portion after a requisite length of negative has past through the opening 93a. In this manner, continued movement of the hinge 38a displaces the tab 84a away from the spread rollers to outside the camera. This displacement indicates to a user that processing can be initiated and that the tab can be pulled for commencing processing.

Figure 14:
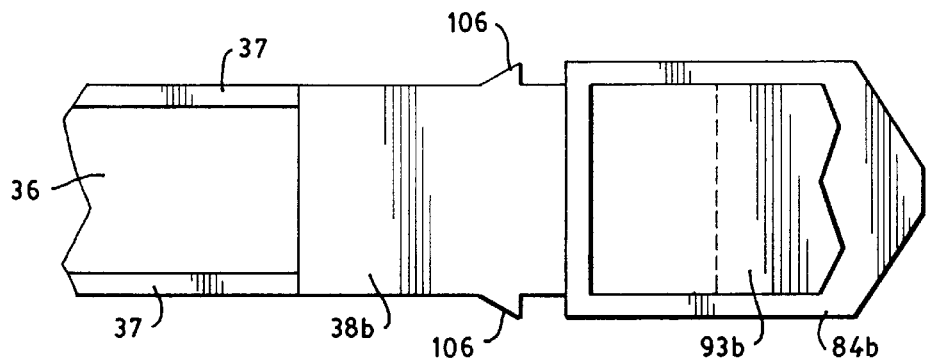
FIG. 14 is a diagrammatic view of another embodiment of a pull tab mechanism.

Reference is made to FIG. 14 for illustrating still another embodiment for displacing the tab 84b for indicating that processing is ready. In this embodiment, the hinge 38b is provided with a pair of protrusions 106 wider than the tab opening. As a result, the protrusions 106 engage a trailing edge of the pull tab 84b so as to displace it from the nip of the spread rollers, thereby indicating to a user that processing can be commenced and assisting in the user being able to readily grasp it.

Figure 15:
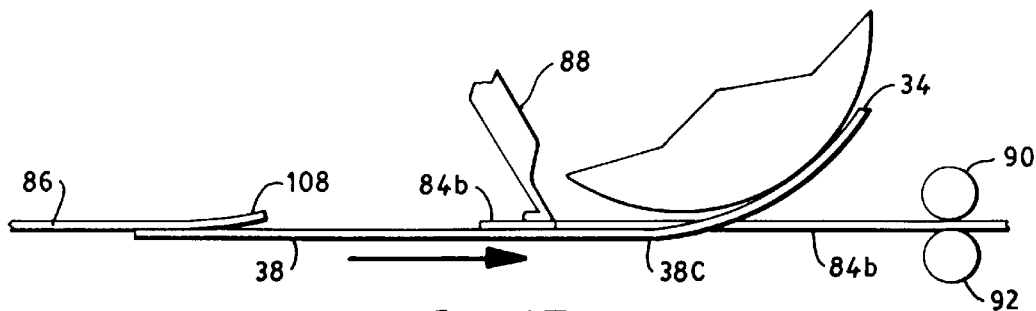
FIG. 15 is a diagrammatic view of another embodiment of a pull tab mechanism.

FIG. 15 schematically depicts yet another preferred embodiment illustrating a construction for displacing the pull tab 84b relative to the spread rollers for indicating to a user that processing can commence. In this regard, a flap 108 is formed to engage a trailing edge of the pull tab thereby pushing the latter outwardly relative to the nip of the spread rollers. The flap 108 can be formed in a variety of ways and in the illustrated embodiment is formed as a leading edge portion of the carrier sheet which is adjacent the hinge portion 38c and is bent to extend upwardly as the pod 88. The flap 108 has sufficient rigidity to retain its configuration before and during use. The flap 108 can be replaced by other structural and functional equivalents, for example, a tooth member or the like.

FIG. 16 schematically illustrates another embodiment of the pull tab 84d before the latter is pulled from the nip of the rollers. In this embodiment, the pull tab 84d has a generally U-shaped configuration with the leading edge of the legs 110'a and 110'b being attached to a pulling element, such as a generally U-shaped pull handle 112 which has its ends snapped into holes in the legs. The pod 88 is also flexibly attached to the trailing edge of the pull tab. In this embodiment, a flap 108 is provided on the carrier strip. The flap 108 is oriented upwardly so as to engage the trailing edge of the pull tab 84d and thereby urge the latter outwardly relative to the camera housing after the negative strip has been advanced sufficiently by the take-up spool. While in the illustrated embodiment the flap is depicted on the carrier strip 36, it will be understood that the flap 108 can be located on the hinge. Of course, the present invention contemplates that indication of a processing ready condition can be achieved by a variety of approaches including electric and the like instead of solely relying on displacement of the pull tab.

Reference is made to FIG. 17 which illustrates an embodiment similar to FIG. 16 wherein the pull tab 84e has a generally U-shaped configuration; but the legs are oriented in the opposite direction relative to their direction in FIG. 16. Also, the pod 88a is connected thereto by flexible strips which are adhesively joined to the legs 110'a and 110'b. The pull tab 84e has a flap 108 which is adapted to engaging a trailing edge of the pull tab for displacing the latter from the nip.

FIGS. 18–20 show another embodiment, wherein the pull tab 84f is a generally T-shape member 114 that has a pod 88 attached to a trailing edge of its body which is generally transverse to an elongated stem portion 116. The pull tab 84f is frictionally held by sidewalls of the housing; whereupon the stem 116 can protrude through a slot 118 when the flap 108 urges the pull tab 84f rightwardly as viewed in FIGS. 21 and 22. In this embodiment, the pull tab must is not initially placed in the nip of the spread rollers. Rather, the desired spread roller pregap position is maintained by for example a pair of thin shims 120 . The shims 120 are dislodged s from the bite of the rollers such as when the pull tab is pulled by the user. In this embodiment, the shims 120 are plastic members having an appropriate thickness for establishing a desired pregap.

Figure 21:
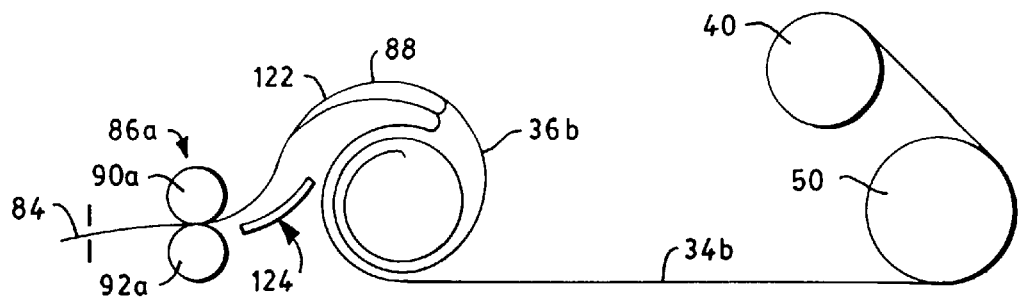
FIGS. 21 and 22 are diagrammatic views of another embodiment of a pull tab mechanism.
Figure 22:
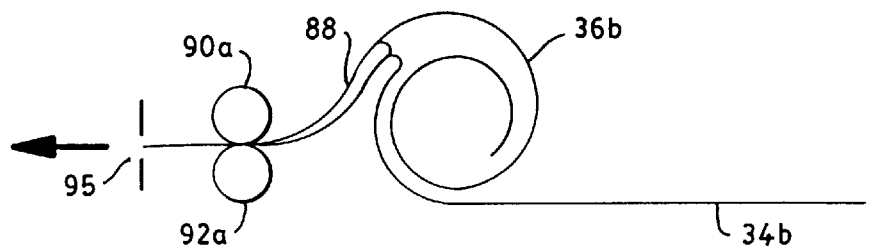
Figure 23:
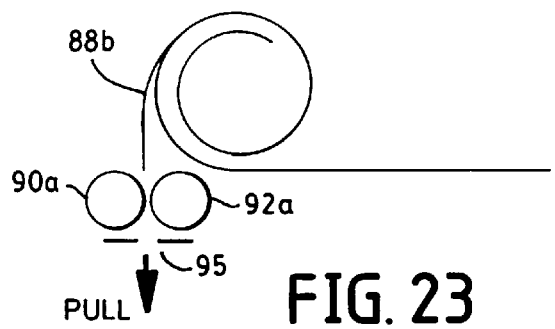
FIG. 23 is a diagrammatic view of another embodiment of the pull tab pulling process.
Figure 23A:
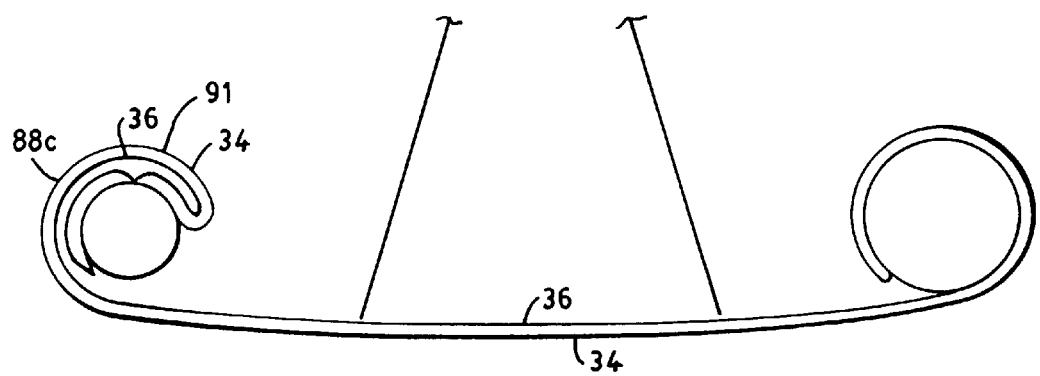
FIGS. 23A and 23B are diagrammatic views of an arrangement of a carrier sheet and photosensitive film being integral.
Figure 23B:
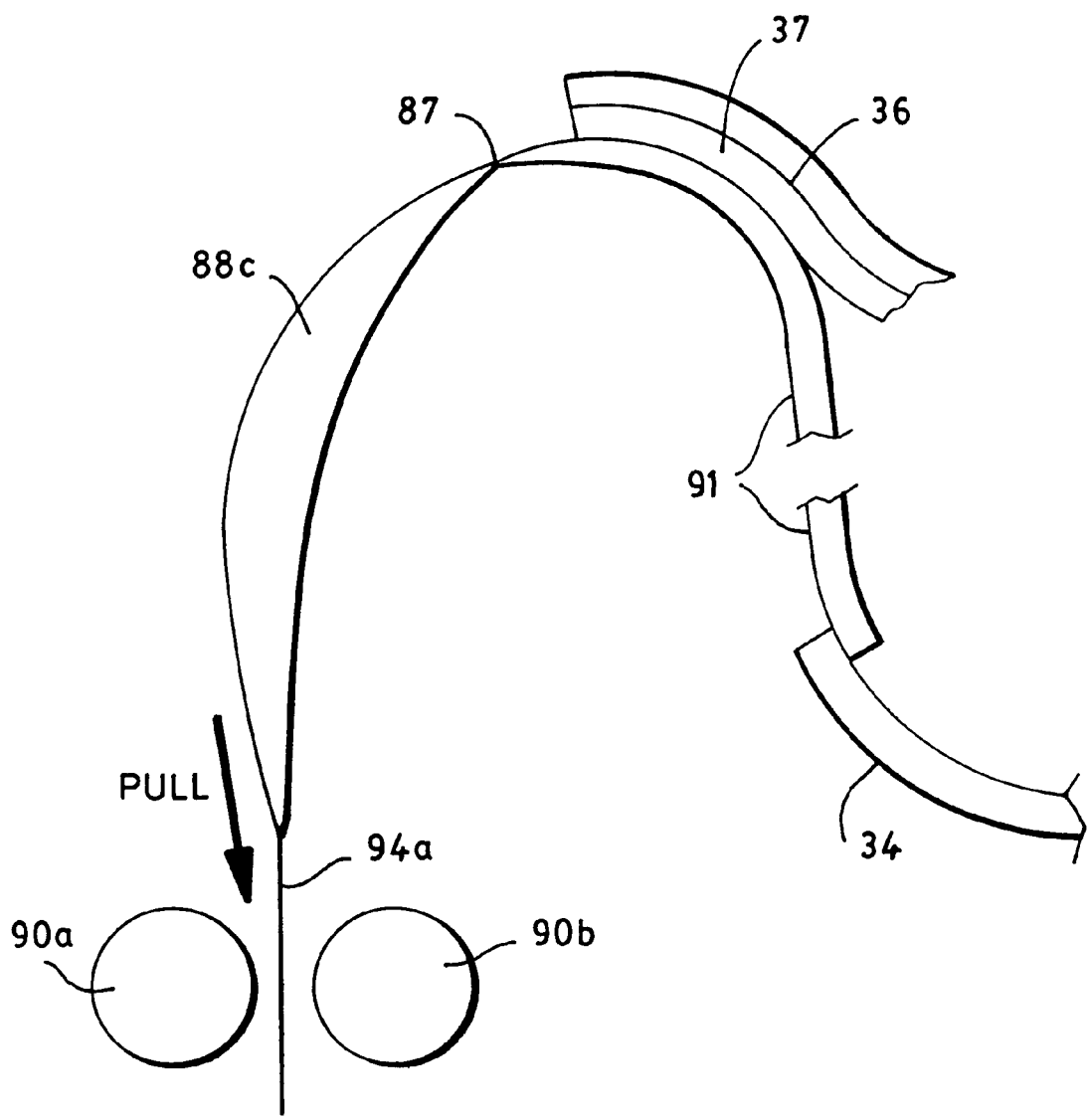

Reference is now made to FIGS. 21–23 for illustrating embodiments in which the pod instead of being attached to the pull tab is integrally attached to the film. FIG. 21 shows a curved pod 122 attached to the rolled film strip adjacent the carrier sheet 36b. One end of the carrier sheet 36b is attached to one surface of one end of the pod 122 and the negative sheet 34*b* is attached to the opposite side of the pod. In this embodiment, there is no hinge. Also in this embodiment, the spread roller assembly 86*a* is adapted to be placed on the same side of the exposure area 38 as the supply spool assembly. The pod 122 has as noted a curved configuration for facilitating their movement through the spread roller nip. A curved chute 124 guides the pod during its movement past the spread rollers. A pull chord element 84*g* is to be pulled by the user and is attached to the curved pod. The pod chord or other suitable pulling element will not extend from between the nip prior to pulling on the latter. FIG. 23 is similar to FIGS. 21 and 22 but shows an embodiment in which a pull chord (not shown) pulls the pod directly downwardly from the camera without the use of a chute. In this regard, the spread rollers 90*a* and 92*a* are positioned as indicated. FIG. 23A is another embodiment wherein a transparent carrier sheet and a photosensitive layer are cowound on a supply spool and are arranged to pass through the film plane for film exposure and are then cowound on the take-up roller assembly prior to processing. In this embodiment, the pod 88*c* (FIG. 23B) has one end of a flexible jump strip 91 attached to one side of a pod flap 87 and the other end of the strip to a photosensitive sheet 34*c*. The end of the jump strip 91 attached to the pod flap is also attached adhesively to the rails 37*c* at least adjacent the pod so as to thereby provide for leakage protection. when the pod is ruptured and the contents of the pod flow between the sheet 34*c* and the carrier 36*c*. In this embodiment, the carrier sheet 36*c* and its rails are attached to the pod flap 87. For commencing processing, the loop 94*a* on the pod 88*c* will be pulled downwardly through the pregapped rollers. As a result, the rollers 90*a*, 90*b* will rupture the pod 88*c* and the reagent will pass between 34*c* and 36*c* as the latter are simultaneously unwound from the take-up roller.

Figure 28A:
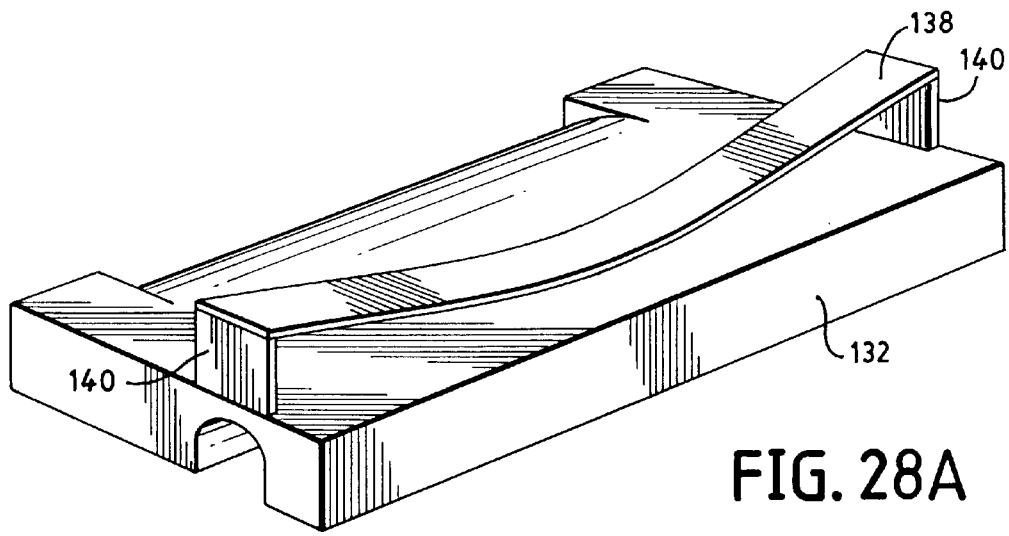
FIGS. 28 and 28A are enlarged and fragmented views of the biasing of an upper one of the pair of pillow blocks; and, FIG. 29 is a schematic view of an integral film assemblage having a series of developed images which assemblage has been pulled from the camera.
Figure 28:
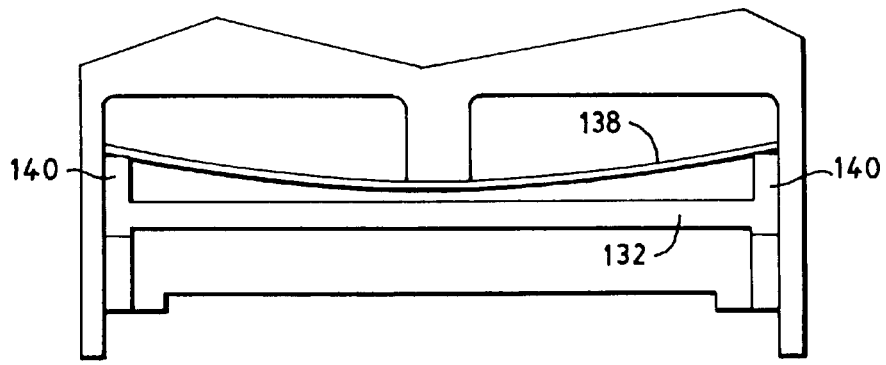

In FIGS. 27, 28 & 28A, there is illustrated one preferred embodiment of the spread roller or pressure applying assembly 86 which is located in the camera housing 12 adjacent the take-up spool assembly 42. The pressure applying assembly 86 is of a type which is operable for bursting the processing pod 88 and spreading 20 its processing fluid between the superimposed surfaces of the exposed negative and carrier strips. The pressure applying assembly 86 includes a pair of spread rollers 90 and 92 and corresponding pair of spaced apart generally parallel and lower and upper elongated pillow block members 130, 132; respectively. The pillow blocks act to hold the spread rollers for rotation. The pillow block members are spring loaded by a suitable biasing device (not shown) which applies the forces necessary to achieve the desired processing as well as of course the bursting of the pod. The pillow block members 130, 132 are made of suitable plastic such as polyester or lubricated styrene and the spread rollers can be made of drill rods made of a suitable steel with smooth surfaces that permit slippage thereof relative to the pillow blocks. Such slippage allows the entire roll of film to pass through the drill rods so that the film system be processed consistent with the teachings of this invention. By having the drill rods, there is provided a relatively inexpensive set of spread rollers which can effect the desired spreading for self-developing processing. Although not shown, the present invention envisions the use of a spreading assembly which includes a spreader bar. The lower pillow block member 130 is received within a correspondingly formed well 134 in the cover 12*b*. The upper pillow block member 132 is normally biased downwardly by a leaf spring 138 which has its opposite longitudinal ends abutting spaced projections 140 and its intermediate portion engaging a center projection so as to normally bias the upper pillow block member 132 into engagement with the lower pillow block member so as to close the nip therebetween with sufficient force for being able to properly rupture the reservoir and spread the processing fluid therebetween during processing of the film system. The pillow block members 130, 132 provide edge control functions for the fluid on the film system as the latter is passed through the spread rollers 90, 92. The nip of the spread rollers 90, 92 are, however, normally kept open prior to processing because of a pull tab member which is physically interposed therebetween. Once the pull tab is removed, the spring is active to urge the rollers into full engagement with one another. Reference is made back to FIG. 3A for illustrating that the back cover 12*b* is formed with a well 144 which serves to functionally serve as the lower pillow block for the lower peel roller.

After having explained the construction of camera, it is believed that its operation is self-evident. However, to supplement that description it will be understood that once all the series of latent images have been exposed by having the photosensitive strip advance by the take-up means, the hinge portion is situated within the tab opening. After the last exposure the flap on adjacent the leading edge of the carrier sheet will engage the pull tab as the former is advancing so as to push the pull tab from between the nip of the rollers. In this manner, the pull tab is pushed from the camera exit. Accordingly, the user can pull on the finger loop and thus pull the pull tab, the associated film strip, and carrier sheet through the spread rollers and outside the camera for initiating developing as noted above. During the noted pushing of the tab, the tab finger is acted upon to release the pawl, thereby freeing the take-up reel for rotation. Consequently, with the pull tab displaced from the spread rollers, the user's pulling action on the pull tab serves to pull the tab and its associated pod into and through the nip of the spread rollers. The pod will burst and the processing reagent fluid will be dispensed and spread between the mutually facing surfaces of the strips which are brought into juxtaposed relationship with each other as they progressively move through the rollers during continued pulling action. The processing fluid initiates the development between the film and the sheet. In this embodiment, the development takes place, whereby the carrier sheet receives the developed latent image. However as noted, the carrier sheet need not receive the developed image, but can merely be used for spreading the processing reagent and thereby developing the latent images recorded on the film. In this latter case, of course, the carrier sheet will be peeled from the film. Which ever type of film system is processed according to this invention, the series of latent images are developed as the film is advanced from the camera and the individual developed images can be suitably cut by the operator such that the individual frames are formed. Accordingly, there results extremely simple and inexpensive apparatus and methods for reliably exposing and developing self-developing type in the context of a single-use camera.

Initial reference is made to FIGS. 30–34 for illustrating one preferred embodiment of a film assemblage 200 made according to the principles of the present invention. FIG. 30 represents an elongated strip made of a plurality of image forming subassemblies 201, 202 made of the materials similar to that described above in connection with the previous embodiments. Thus, detailed descriptions thereof are not necessary for understanding this embodiment. However, only those portions thereof necessary for understanding the present embodiment will be set forth. However, it will be understood that the film assemblage 200 may include several of the image forming assemblies described herein. Further, consistent with the principles of the present invention, each image forming subassembly may be of such a predetermined length as to encompass a single frame exposure or may in fact carry multiple frame exposures.

With reference to FIGS. 30 and 31, it will be seen that each image forming subassembly 201, 202 includes a predetermined length of receiving sheet 204, 205, each of which, has a pair of rails adhesively attached along the longitudinal edges thereof. In addition, the film assemblage 200 includes a leader means 206, 208 for each subassembly 201, 202; respectively. Each leader means 206, 208 is comprised of a sheet of paper or, preferably, other non-film material and has an adhesive strip 216, 212 formed intermediate therein. A pair of registration holes 214, 216 extend through each of the adhesive layers and the paper leaders; respectively. In addition, perforations 218 extend through each pair of leader and adhesive layer. The perforations 218 are for purposes of facilitating separation of each subassembly, such that discrete subassemblies may be withdrawn from the camera and separated prior to other unexposed subassemblies of the film being exposed and developed.

Reference is made to FIG. 30, wherein the leader 208 has an end portion overlapping and adhesively bonded to a leading edge of an elongated strip of negative 220. The trailing end portion of the negative strip 220 has a tape 222 strip joining it to a leading edge of a hinge sheet 224 as best represented in FIG. 33. In this regard, the tape strip 222 is adhesively connected to the trailing edge of the negative with a leading edge of the corresponding hinge material. The trailing edge of the hinge 224 has a connection to receiving sheet 204 as shown in FIG. 32. As depicted in FIG. 32, the leading edge portion of the receiving sheet 204 is adhesively bonded to a corresponding trailing edge portion of the hinge material so that an unlaminated portion 226 provides a gap 228. The unlaminated portion 226 serves as a tab 230, the operation of which will be made apparent in the subsequent description. The trailing edge of the receiving sheet 204 is coupled to the supply spool assembly 232. Accordingly, the foregoing description is representative of the components forming image forming subassembly 202. The image forming subassemblies 201 has the same construction to that described above. Basically, the receiving sheet 205 has its trailing end portion adhesively connected to a leading portion of the leader 208. The leading end of the receiving sheet 205 is connected to the hinge 234 so as to form a tab 235; similar to the tab 230. The negative sheet 236 is connected by the tape 238 to the hinge 236. It will be appreciated that the leader means 206 is attached to the take-up roll 239 as viewed in FIG. 30 and the hinge 234.

Reference is made to FIG. 35 for illustrating the initial arrangement of the film assemblage 200 within the camera 240 with the appropriate portions of the leader 210 and receiving sheets 204 attached to the take-up and feed spools respectively. To better understand this initial cooperation of components, prior to exposure, it will be appreciated that intermediate portions of the film assemblage 200 extend through openings 242, 244 in the pair of first and second pull tabs 246, 248 (See FIGS. 35 and 36) for facilitating passage of the film assemblage. The pull tabs 246, 248 have their leading ends in cooperative relationship with a film stop member 250. As viewed in FIG. 35, the longitudinal edges of each upper and lower pair of pillow blocks on each side of the film 252 have relief portions 254, 256 arranged to receive respective ones of the edge portions of the tabs. The second tab 246 has its leading edge resting on a sloped camming surface 258 of the film stop member. The first pull tab 246 is arranged in the slot in the pillow block such that it cooperates with the lowermost incline surface 260. The film stop member 250 has a pair of generally square-shaped protrusions 262 formed therein, which cooperate with respective openings in the leaders so as to effect a stopping action. As a consequence, subsequent unexposed image forming subassemblies cannot be inadvertently pulled from the camera by the user when a developed subassembly is being pulled.

As schematically represented in FIGS. 35 and 36, the uppermost surface of the stop member 250 has a push rod 264 coupled thereto. The push rod 264 is coupled appropriately to the other end portion of a ratchet arm 266. The ratchet arm 266 is pivotally mounted to the camera housing such that its ratchet tooth 268 can effectively engage and disengage with the ratchet teeth of the ratchet wheel (not shown) mounted on the take-up roll 239. The ratchet arm 266 is biased by a spring biasing member 270, whereby the ratchet is normally held in engagement by the ratchet teeth. Accordingly, the take-up roll 239 can rotate one direction only during winding of the film.

Reference is made to FIGS. 37–46 for describing the operation

For commencing operation of the camera such that each of the serially connected image-forming subassemblies can be sequentially and independently exposed and developed, an operator will commence operation by depressing the shutter button as described in the previous embodiments for taking an exposure. The meter roll 272 will be effective to advance exposed film at the exposure plane, onto the take-up roll 239. As noted earlier, the negative sheet 236 has a predetermined length sufficient for carrying either a single frame image or multiple frame images thereon. Upon completion of exposure of the entire negative sheet of the first subassembly 201, the tab portion 235 will engage the pull tab 246 and as it is displaced towards the meter roll will displace the lower pull tab 246 into engagement with the camming surface 260. Consequently, the force generated is sufficient to drive the push rod 264 upwardly against the bias of the spring 270. This action releases the ratchet 268 from the ratchet wheel. In this manner, the take-up roll 239 can be rotated in an opposite direction for reasons that will be self-evident. The tab 235 will displace the pull tab 246 through the bite of the pressure rollers 90, 92 by an extent which allows a user to grasp its leading edge. As a consequence, the operator can pull on the pull tab 246 such that the exposed portion of the negative 236 and the corresponding portion or segment of the receiving sheet 205 will be brought into overlying relationship to one another. As the pull tab 246 emerges from the exit slot (not shown) of the camera, the hinge 234 will fold and be effective to pull the corresponding negative and receiving sheets through the pressure-applying rollers 90, 92. Contemporaneously, displacement of the pull tab 246 effects displacement of the pod 274 such that the pod is burst thereby distributing its contents as described in the above embodiments.

As viewed in FIGS. 38–42, the leading end of the second pull tab member 248 is displaced rearwardly by reason of the sloped surface 258 on film stop member being raised by the pull tab 246 entering the pressure rollers. Once the first pull tab has been removed, the second assumes the place of the first.

The pulling action on the first pull tab continues until the first leader 206, having the adhesive strip 210 is pulled from the take-up spool 239 and passes into the spreader assembly. At the same time, the second leader 208 with adhesive strip 216, arrives at the spreader mechanism. Accordingly, both leaders with their adhesive strips 210, 212 are joined together.

It will be understood that the spring 220 urges the push rod 264 and thus the stop member downwardly as viewed in the drawings. The stop protrusions 262 will ride on the film surface until they cooperate with the apertures formed in the leader. As a result, the protrusions will register with the apertures in the leader and thus stop further displacement of the film assemblage located within the camera. Subsequent pulling by the operator will effect a separation at the perforation.

It will also be appreciated that return of the stop cam member to its original position will be effective to allow the ratchet 268 to reengage the ratchet wheel such that the take-up spool 239 can again be operated in frame-by-frame fashion. With the components in this arrangement, the operator will again commence exposure of the negative 220 in frame-by-frame fashion, thereby allowing the negative to be wound upon the take-up roll 239. Since the first pull tab has been removed from the camera, the second pull tab is now positioned such that it engages the lower surface 260. The second pull tab will remain in such position until it is engaged by the tab 230 on the second image forming subassembly 202. It will be appreciated that the tab 230 will displace the pull tab outwardly through the camera's exit opening. During the outward displacement of the pull tab 248, the stop 250 will be raised. Hence, the stop protrusions 262 will be lifted from the holes 214, 216 in the leaders, thereby allowing the film to be pulled through the spread rollers and outwardly from the camera. Of course, with the stop member being raised again by the pull tab 248 such action effects a disengagement of the ratchet. This frees the take-up roll for rotational movement in the opposite direction. With the second pull tab member having its leading edge portion protruding from the camera, an operator may commence a second pulling operation of the second assembly. In this second pulling operation, the operator withdraws the exposed second segment of exposed negative from the take-up roll such that it will be in superposed relationship with the receiving sheet 204 which is being simultaneously pulled from the supply roll 232. Continued outward pulling on the pull tab 248 will cause the second pod to be displaced outwardly with the pull tab. Accordingly, the processing reagent will be spread in the manner noted above to effect the diffusion transfer process. Continued motion of the pull tab will be effective to withdraw the entire contents of the film assemblage with the second film image forming subassembly in the desired superposed relationship to form an integral film strip. After having described the last preceding embodiment, it is believed that the operation thereof is self-evident.

Although several specific and preferred methods and apparatus of the present invention have been shown and described above, other variations of the present invention will become apparent to those skilled in the art. The scope of the invention is therefore not limited to the specific forms shown and described but rather is 20 indicated by the claims below.

What is claimed is:

1. A method of processing exposed photosensitive self-developing film in a single use camera comprising the step of: providing a strip of exposed photosensitive self-developing film and a carrier strip of sheet material; advancing the photosensitive film and carrier sheet through a pressure applying assembly; dispensing processing fluid between the film and carrier sheet before they pass through the pressure applying assembly, whereby the processing fluid is spread between the film and the sheet to initiate development as the film and sheet pass through the pressure applying assembly and exit the camera as an integral self-developed film strip; further comprising the step of establishing a self-seal along the longitudinal edges of the film and the sheet material when they are brought into superimposed face-to-face contact with each other wherein the self-seal is established by a reaction of the processing fluid with a self-sealing adhesive material at least along the marginal longitudinal edges of at least one of the sheet and the film.

2. The method of claim 1 wherein the self-sealing material is selected from a group consisting of a gelatin; a copolymer of maleic acid and a methylvinylether; and HEC (hydroxyethylcellulose).

3. The method of claim 1 wherein the carrier sheet is a strip of transparent sheet material.

4. The method of claim 1 wherein one of the sheet or the film is provided with longitudinal rails along longitudinal marginal edges thereof.

5. The method of claim 1 wherein the step of dispensing processing fluid is achieved by rupturing a reservoir of the fluid as the film and the sheet are brought together in the pressure applying assembly.

6. The method of claim 5 wherein the step of rupturing the reservoir is achieved by advancing the reservoir into a position between the film and the sheet.

7. The method of claim 6 wherein the photosensitive film and the sheet are joined together in end-to-end relationship and are wound on a common supply spool assembly in the camera with the film overlying the carrier sheet.

8. The method of claim 7 further comprising the step of joining the photosensitive film and sheet is achieved by a foldable means.

9. The method of claim 1 further comprising the step of indicating to an operator when the photosensitive film strip is ready for processing.

10. The method of claim 9 further comprising the step of connecting a pull tab member to the reservoir and allowing the photosensitive film to pass through the pull tab as the photosensitive film passes from a supply spool assembly to a film take-up assembly.

11. The method of claim 10 wherein said step of indicating processing readiness including providing means on at least one of a hinge means or the carrier sheet for engaging a trailing edge of the pull tab member for displacing the pull tab member in said pressure applying assembly in response to completion of exposing the photosensitive film so that the operator is aware of the fact that processing can commence.

12. The method of claim 11 further comprising the step of allowing a portion of the pull tab member to be manually gripped by an operator from a position exterior of the camera so that the operator can pull both the photosensitive film and the carrier sheet through the pressure applying assembly and exit from the camera as the integral film unit.

13. The method of claim 12 further comprising the step of having the hinge means engage and displace the rupturable reservoir so that the reservoir is pushed into the bite of the pressure applying assembly, whereby the reservoir can be ruptured as the pull tab member is being pulled.

14. The method of claim 1 wherein he step of advancing the photosensitive film further includes the step of advancing the film from a supply spool assembly to a take-up assembly and is achieved by passing the photosensitive film through a pull tab member which pull tab member is manually pullable from the camera so that both the film and carrier sheet are pulled from the camera, and wherein said dispensing step further includes a pod of processing fluid being carried by the pull tab member so that as the pull tab member is pulled the pod ruptures after engaging the pressure applying assembly.

15. The method of claim 14 wherein said advancing step comprises the step of advancing the photosensitive film to the take-up assembly but not advancing the carrier sheet thereto.

16. A method of processing a strip of photographic film of the instant developing type comprising the steps of providing a housing assembly with an exit opening; providing a roll of photosensitive self-developing film in the housing assembly; providing a roll of carrier sheet in the housing assembly; providing means for interconnecting end portions of the photosensitive film and the carrier sheet so that both are cowound on a supply spool assembly; providing a pulling means connected to the interconnecting means; providing a take-up means which is connected to the end portion of photosensitive film and being operable for advancing the photosensitive film past an exposure station for allowing exposure of the photosensitive film; pulling on the pulling means from outside the camera so as to simultaneously pull the exposed photosensitive film from the take-up means and the carrier sheet from the supply means through a pressure applying means; and, dispensing processing fluid from a rupturable pod on and between the film and the carrier sheet before the film and carrier sheet pass through the pressure applying means and out of the exit means, whereby the dispensed fluid is distributed between the film and the sheet such that there results an integral processed film strip.

17. A single-use camera comprising: a housing assembly including film exit means; a strip of self-developing photosensitive film; a foldable strip of carrier sheet material; means for taking up said photosensitive film strip past an exposure station for exposure thereof and for storage of said exposed photosensitive film strip; means for advancing said exposed photosensitive film strip from said taking up means and said carrier strip through said exit means; means operable for dispensing processing fluid between the exposed film strip and said sheet; said dispensing means includes a rupturable reservoir containing processing fluid which is rupturable in response to engaging said pressure applying means; and, pressure applying means operable for superimposing said photosensitive film relative to said carrier sheet following dispensing of said fluid between said film and sheet for distributing the fluid over preselected portions of the exposed photosensitive film to form an integral photographic film strip in response to said advancing means withdrawing said strip and said sheet through said pressure applying means and said exit means.

18. The camera of claim 17 wherein said self-sealing material is selected from a group consisting of a gelatin; copolymer of maleic acid and a methylvinylether; and HEC (hydroxyethylcellulose).

19. The camera of claim 18 wherein said carrier sheet is comprised of a transparent material.

20. The camera of claim 19 wherein one of said film and said sheet includes a pair of longitudinal rails along a longitudinal extent thereof.

21. The camera of claim 17 wherein said photosensitive film and carrier sheet are joined together in end-to-end relationship and coiled around a common supply spool assembly rotatably mounted in said camera wherein said photosensitive film is wound over said carrier sheet.

22. The camera of claim 21 further including a foldable hinge means connected to and between said photosensitive film and said carrier sheet.

23. The camera of claim 22 further comprising means for indicating to an operator that said photosensitive film, is ready for processing.

24. The camera of claim 23 further comprising pull tab means connected to said hinge means for allowing said photosensitive film to pass through said pull tab means as the photosensitive film passes from a supply spool assembly to a film takeup assembly.

25. The camera of claim 24 wherein said indicating means is operatively associated with said hinge means for displacing said pull tab means outside said exit means in response to completion of exposing the photosensitive film.

26. The camera of claim 25 wherein said advancing means includes a pull tab member which has one end portion connected to said hinge means, and has a slot for allowing said photosensitive film to pass therethrough as said film is exposed.

27. The camera of claim 26 wherein said pressure applying means includes a pair of pressure applying spread rollers which define a nip through which the sheet and the film pass in response to being advanced by said advancing means.

28. The camera of claim 27 wherein said pressure applying means includes a pair of spaced apart pillow block members for rotatably holding each of said spread rollers, wherein said pillow block members also act as edge guides to the passing film and sheet.

29. The camera of claim 28 wherein said pull tab member includes a portion manually grippable by an operator from the exterior of said camera so that the operator can pull said pull tab and said photosensitive film and said carrier sheet through said pair of spread rollers and from said exit.

30. The camera of 29 wherein said pull tab portion maintains the nip in an open condition before being pulled from said spread rollers.

31. A camera comprising: a housing assembly; a sheet of photosensitive self-developing film; a sheet of carrier film; supply means having consecutively wound thereon the photosensitive and carrier sheets; hinge means for coupling one end portion of the photosensitive sheet to the carrier sheet; take-up means for unwinding the photosensitive sheet from said supply means for allowing sequential exposure of the photosensitive sheet at a focal plane of the camera; advancing means operably connected to said hinge means and being displaceable exteriorly of said housing assembly by an operator for pulling the exposed photosensitive sheet from said take-up means and said carrier sheet from said supply means; a rupturable reservoir means containing processing fluid is connected to said hinge means and is displaceable between said carrier and negative; and, pressure applying means for rupturing said rupturable reservoir and spreading the processing fluid to and between said photosensitive and carrier sheets as said sheets advance therethrough in response to being displaced from said camera by said advancing means.

32. A method of sequentially processing individual exposable segments of photosensitive self-developing film in a single use camera; said method comprising the steps of: providing a plurality of segments of exposable photosensitive self-developing film in a single use camera; providing a plurality of segments of carrier sheet in the camera; sequentially advancing corresponding and superimposable pairs of segments of film and carrier sheet through a pressure-applying assembly; selectively dispensing processing fluid between each corresponding pair of film and carrier sheet prior to passing through the pressure applying assembly, whereby the pressure-applying assembly spreads the processing fluid between corresponding pairs of film and carrier sheets as the latter are sequentially brought into a superimposed relationship for initiating development of the latent images as the respective pairs of film and the carrier sheet emerge from the pressure applying assembly and exit the camera; further comprising the steps of: connecting the respective sequential segments of film and the respective sequential segments of carrier sheet with respective flexible connecting means; and joining each sequential subassembly of film, connecting means, and carrier sheet by leader means for forming an elongated strip of film assemblage having a plurality of serially arranged image forming subassemblies; and, pulling on the connecting means of each of the subassemblies by a corresponding pulling means so that the corresponding pair of film and carrier sheet of each of said subassembly is brought into intimate superimposed contact with each other as the pulling means is pulled from the camera through the pressure applying assembly.

33. The method of claim 32 wherein the step of: dispensing the processing fluid is achieved by sequentially rupturing respective ones of a plurality of processing fluid reservoirs for dispensing the contents between a respective pair of superimposable film and carrier sheet prior to the pair being brought together by the pressure applying assembly.

34. The method of claim 33 wherein said dispensing step includes the step of having each rupturable reservoir connected to and displaceable with a corresponding pulling means for passing through the pressure applying assembly and being ruptured.

35. The method of claim 34 further comprising the step of separating each developed subassembly of film and carrier sheet for forming separate and discrete developed image carrying segments, each of which has at least a single developed frame.

36. The method of claim 35 further comprising the step by providing the film assemblage with a leader portion on one of the image forming subassemblies cooperating with a leader portion on a subsequent subassembly, whereby both of the leaders are brought together while the one image forming subassembly is being withdrawn from the camera for thereby stopping further displacement of undeveloped subassemblies outside the camera by being pulled by an operator through the pressure applying assembly.

37. The method of claim 36 further comprising the step of: providing a separable portion for facilitating separation of adjacent image forming subassemblies.

38. The method of claim 34 further including the step of preventing subsequent development of sequential ones of the corresponding pairs of film and sheet by preventing displacement of undeveloped pairs of film and sheet through the pressure applying assembly after a developed pair has been already pulled from the camera through the pressure applying means.

39. A single use camera for a photosensitive film assemblage having serially connected image forming subassemblies in end-to-end relationship with respect to each other, each of the subassemblies having image forming film segment and corresponding superimposable segment of carrier sheet, each of the subassemblies being processable independently and sequentially of the others, said camera comprising: a housing assembly including film exit means; means for taking up the photosensitive film assemblage so that successive segments of the image forming film passes an exposure station for exposure thereof such that at least one frame is exposed, and for storing the exposed image forming film segment; means for advancing the carrier strip and the exposed film on said taking up means from said housing assembly through said exit means; means for dispensing processing fluid between the exposed film and the carrier sheet; and, pressure applying means for superimposing the corresponding pair of film and carrier sheet following dispensing of the fluid therebetween and for spreading processing fluid to develop the latent images in response to the advancing means withdrawing the film and the strip from the but means through the pressure applying means; a plurality of rupturable processing reservoirs containing processing fluid, each one of which is cooperable with a corresponding one of the image forming subassemblies; said advancing means includes a plurality of pulling means, each one of said pulling means includes a pulling tab connected to the reservoir which is cooperable with a corresponding one of the image forming subassemblies.

40. The camera defined in claim 39 further including a film stopping means which is operable when in an operative mode for stopping subsequent undeveloped film subassemblies from exiting the camera through said pressure applying means; and, when in the inoperative mode for allowing passage of the film assemblies from the camera.

41. The camera defined in claim 40 wherein said film stopping means includes a stop cam means being operable between the operative and inoperative modes, whereby whenever one of said pulling means is being withdrawn from the camera, said pulling means urges said cam means to the inoperative mode; and said cam means being operable to move to the operative mode after the pulling tab is withdrawn therepast.

42. The camera defined in claim 41 wherein said film stopping means includes stopping means thereon which engages the film assemblage to prevent unexposed film assemblages from exiting the camera.

* * * * *